(12) United States Patent
Barefoot

(10) Patent No.: US 11,623,890 B1
(45) Date of Patent: *Apr. 11, 2023

(54) COAL COMBUSTION RESIDUALS, LEACHATE AND WET ASH WASTES SOLIDIFICATION DEVICES, KITS, AND ASSEMBLIES

(71) Applicant: Stewart Superabsorbents, LLC, Hickory, NC (US)

(72) Inventor: Quint Barefoot, McLeansville, NC (US)

(73) Assignee: STEWART SUPERABSORBENTS, LLC, Hickory, NC (US)

( * ) Notice: Subject to any disclaimer, the term of this patent is extended or adjusted under 35 U.S.C. 154(b) by 113 days.

This patent is subject to a terminal disclaimer.

(21) Appl. No.: 16/993,942

(22) Filed: Aug. 14, 2020

Related U.S. Application Data

(62) Division of application No. 16/128,994, filed on Sep. 12, 2018, now Pat. No. 10,875,808.

(60) Provisional application No. 62/557,236, filed on Sep. 12, 2017.

(51) Int. Cl.
| | |
|---|---|
| C04B 24/24 | (2006.01) |
| B01J 20/26 | (2006.01) |
| B01J 20/28 | (2006.01) |
| C04B 18/26 | (2006.01) |
| C04B 14/10 | (2006.01) |
| C04B 28/02 | (2006.01) |
| C04B 28/04 | (2006.01) |
| C04B 103/00 | (2006.01) |
| C04B 111/00 | (2006.01) |

(52) U.S. Cl.
CPC ............... *C04B 24/24* (2013.01); *B01J 20/26* (2013.01); *B01J 20/28016* (2013.01); *C04B 14/104* (2013.01); *C04B 18/26* (2013.01); *C04B 28/021* (2013.01); *C04B 28/04* (2013.01); *C04B 2103/0051* (2013.01); *C04B 2111/00767* (2013.01); *C04B 2201/50* (2013.01)

(58) Field of Classification Search
CPC ....... C04B 24/24; C04B 14/104; C04B 18/26; C04B 18/021; C04B 28/04; C04B 2103/0051; C04B 2201/50; B01J 20/26; B01J 20/28016
See application file for complete search history.

(56) References Cited

U.S. PATENT DOCUMENTS

| | | |
|---|---|---|
| 5,584,895 A | 12/1996 | Seike et al. |
| 6,221,001 B1 | 4/2001 | Comer et al. |
| 6,797,857 B2 | 9/2004 | Tanhehco |
| 7,291,674 B2 | 11/2007 | Kang et al. |
| 9,533,081 B1 * | 1/2017 | Barefoot ............... A61M 1/882 |
| 10,279,089 B1 * | 5/2019 | Barefoot ............... A61M 1/882 |
| 10,875,808 B1 | 12/2020 | Barefoot |
| 2016/0024291 A1 | 1/2016 | Spittle et al. |

FOREIGN PATENT DOCUMENTS

WO   WO 1991/015291   10/1991

* cited by examiner

*Primary Examiner* — John E Uselding
(74) *Attorney, Agent, or Firm* — Fish & Richardson P.C.

(57) ABSTRACT

An absorbent composition for environmental waste solidification includes a population of superabsorbent polymer particles (SAP) and a second item mixed with the population of SAP. The absorbent composition is configured to absorb moisture from ash waste.

14 Claims, 27 Drawing Sheets

Effect of MAF addition on Undrained shear strength

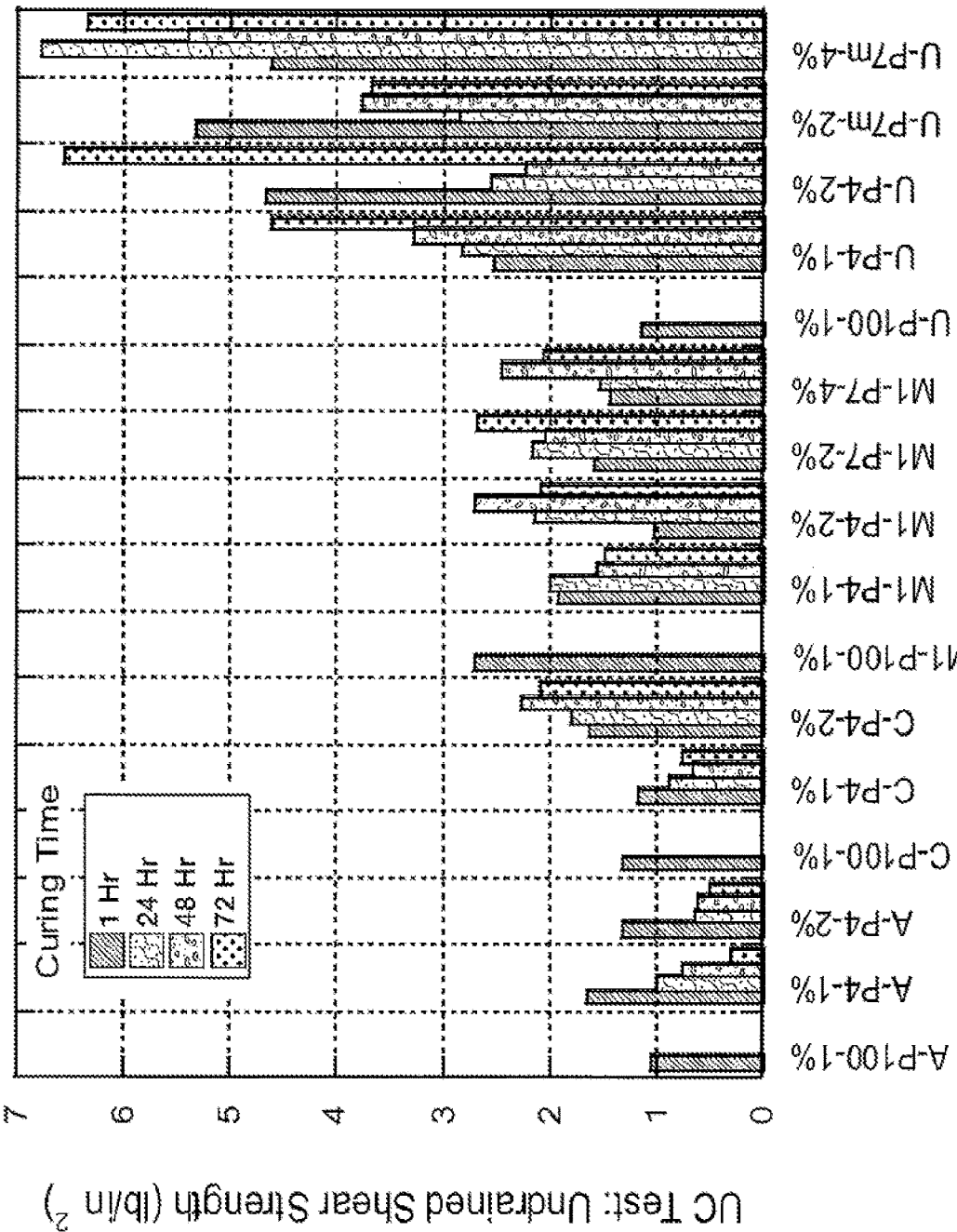

COAL COMBUSTION RESIDUALS, LEACHATE AND WET ASH WASTES SOLIDIFICATION DEVICES, KITS, AND ASSEMBLIES

This application is a divisional of application Ser. No. 16/128,994 filed Sep. 12, 2018, which claims the benefit of Application Ser. No. 62/557,236 filed Sep. 12, 2017.

FIELD OF THE TECHNOLOGY

The present disclosure relates generally to rapid solidification of coal combustion residuals, and more particularly to improved coal combustion residuals solidification devices, kits, systems and methods.

BACKGROUND

Coal combustion residuals (CCRs or collectively "coal ash") are one of the largest industrial waste streams generated in the United States. Coal ash is a toxic laden waste, for example, generated as coal is burned for energy. Coal ash generally contains heavy metals and other toxic remnants that become concentrated and gathered in the ash through the processing process. In 2012, more than 470 coal-fired electric utilities burned over 800 million tons of coal, generating approximately 110 million tons of CCRs in the U.S. Storage and processing of CCRs is a major undertaking and environmental release/exposure to coal combustion residuals can be damaging to the environment, having toxic impacts on the eco-system, and creating extremely exorbitant damage and remediation. Just in the Southeast alone, there are over 400 coal ash storage facilities and over 50 documented contamination sites. At these contamination sites, there is often pollution to the ground and/or surface water, some resulting in "high hazard" coal ash dams as determined by EPA assessment.

It is desirable to prevent the release of coal combustion residuals into the environment and proper containment is an ongoing concern. In the case of a coal combustion residual spill, it is imperative to provide rapid, effective clean-up for the contamination and contaminated area. While some attempts have been made to address these issues, they conventionally are expensive, and not highly efficient or effective.

CCRs may be considered, by way of example, fly ash, coal ash, bottom ash, boiler slag and flue gas desulfurization, and/or scrubber, materials such as synthetic gypsum and the like, which are produced when coal is burned for electricity generation.

CCRs may be generated wet or dry, and some CCRs are dewatered while others are mixed with water to facilitate transport (e.g., sluiced). Some of the CCRs can be beneficially utilized; however, large amounts of CCRs are disposed in surface impoundments and landfills. Thus, CCRs typically are disposed in offsite and/or onsite landfills, or surface impoundments. Generally, coal ash is collected and moved to large coal sludge lagoons or dry landfills for the ultimate storage.

Conventional methods for storage of coal ash in landfills and sludge lagoons attempt to indefinitely and safely store this toxic material in bins and behind dams. However, preserving the integrity of the surrounding water supply and environment, presents demanding concerns, and often the coal ash storage mixture is able to leak into groundwater and/or become released back into the water supply.

CCR Rules newly adopted in the U.S. require unlined CCR ponds to undergo excavation, transport and disposal into lined landfills or in-situ capping. Because CCR ponds are open for relatively long periods of time, they contain a significant fraction of water. Some fly ash may display a tendency to adhere to porewater in the layers of fly ash basins requiring more time to dewater and stabilize. During transport, the ash tends to release water and exhibit instability. If the excavated CCR fails the paint filter test, it cannot be disposed into a lined facility. Managing water in CCR ponds can often require dewatering using in-situ wells, stockpiling and allowing gravity drainage, or pumping into Geotubes. These options are all time consuming and expensive and, in some cases, these methods require treatment before the water is even discharged.

Therefore, Applicants desire alternative cost-effective, more efficient and secure storage and remediation devices, kits and methods that are more reliable in preventing release of CCRs into the environment while being stored and/or provide improved remediation and clean-up of accidental environmental CCR exposure.

SUMMARY

In accordance with the present disclosure, coal ash waste devices, assemblies, systems, kits and methods are provided for packaging, storing, organizing, and solidifying coal ash wastes and the like. This disclosure, in one embodiment, provides improved coal ash solidification devices, kits, assemblies and methods that are cost-effective, convenient, efficient, and safe for the user.

One example of the inventions of the present disclosure is directed to a composition including a superabsorbent polymer for solidification of CCRs. The composition may also include a second material. The composition may be a blend of a SAP and a second blend item. A blend may include one or more SAP. A blend may include one or more SAP and another second blend item.

Other examples of the inventions of the present disclosure may be directed to an absorbent structure containing a superabsorbent polymer and/or a superabsorbent polymer blend. Still other embodiments include a moisture absorbent polymer for moisture laden environmental wastes, by way of example CCRs. One example is directed to a moisture absorbent polymer including a SAP, by way of example of crystals of sodium polyacrylate. The polymer may also include other second items, by way of example, in amounts of bentonite clay, Portland cement, and/or wood fibers in a moisture absorbent formulation (MAF). The moisture absorbent polymer may instigate a waste solidification.

In some examples, non-polymeric particles may be added to an SAP in order to increase the swellability of superabsorbent polymers. In such an application, gel block may be desired and the particle mixture is designed to achieve gel block as a desired end result.

Additionally, the absorbent composition may include a sanitizer. The sanitizer may be granular chlorine.

In other embodiments, the inventions of the present disclosure may include a method of solidifying CCRs. In yet other embodiments, the inventions of the present disclosure may include a method of making a composition for solidification of CCRs.

In some examples, the inventions of the present disclosure include a solidification system for environmental waste solidification. The solidification system includes a blend including an absorbent polymer. The absorbent polymer may include SAP. The SAP may be granular. The SAP may be loose and dispensed from a bottle and/or a container. The SAP may be housed in a packet. The packet may be configured to allow liquid penetration. The packet in some examples may be made of dissolvable polyvinyl alcohol and/or any other suitable water soluble film.

In some examples, the composition is considered the SAP mixture of Example 1, Example 2, Example 3, Example 4, Example 5, and/or Example 6, individually and/or in combination.

An absorbent composition for environmental waste solidification in some embodiments includes: a population of superabsorbent polymer particles; a second item mixed with the population of superabsorbent polymer particles; and wherein said absorbent composition absorbs moisture from an Ash waste, forms a solidified Ash mixture, the solidified Ash mixture configured to pass a paint filter test.

Still other examples are considered a system for solidification of moistened Coal Ash, including: substantially between 0.5% and 2% of SAP by dry weight; and a material, when combined with moistened Coal Ash having a water moisture up to as high as about 75%, able to stand at an undrained shear strength ranging from about 2 to about 10 psi.

A system for solidification of moistened Coal Ash may include an amount of SAP. The SAP may be mixed with an amount of bentonite. In some examples, SAP and about 50% bentonite form a blend. The blend may also include amount of Portland cement. The blend in some examples includes about 50% SAP, about 25% Bentonite, and about 25% Portland cement. The blend in other examples includes between about 70-80% SAP, between about 5-10% bentonite, and between about 5-10% Portland cement. Still other blends may include between about 5-10% wood flour. The SAP may be contained in power pellets. The power pellets may include, by way of example, between about 2-8% SAP. The SAP may be cross-linked internally and on its surface. The amount of SAP may be contained inside a water soluble packet.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which:

FIG. 11 is a graph overview comparison of exemplary Fly Ash samples according to inventions of the present disclosure tested according to unconfined compression testing.

DESCRIPTION OF EXEMPLARY EMBODIMENTS

Figure 1:
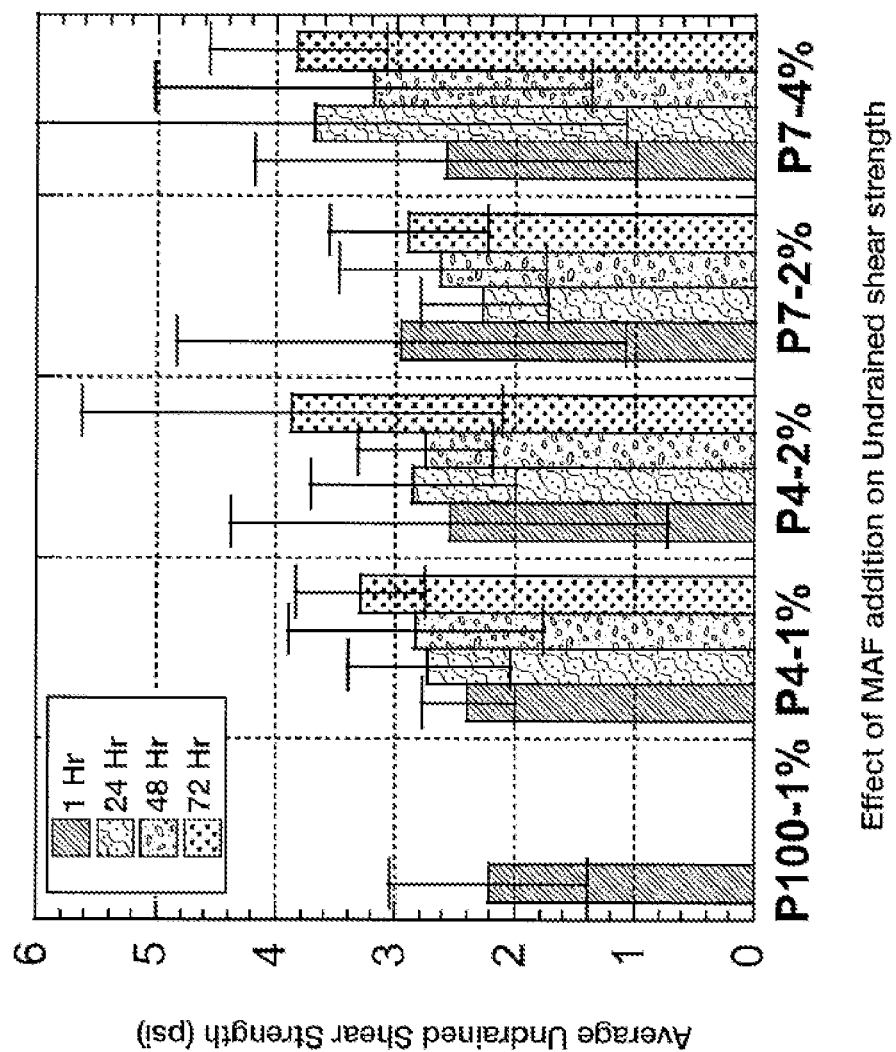
FIG. 1 is an example evaluation and results of the effect of MAF addition on Undrained Shear Strength.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general, it will be understood that the illustrations are for the purpose of describing embodiments of the disclosure and are not intended to limit the disclosure or any invention thereto.

Superabsorbants are known in the art as water-swellable, water-insoluble, organic or inorganic material capable of absorbing at least about 100 times its weight in an aqueous solution. Superabsorbent polymers are cross-linked, neutralized polymers which are capable of absorbing large amounts of aqueous liquids and body fluids, such as urine or blood, with swelling and the formation of hydrogels, and of retaining them under a certain pressure in accordance with the general definition of superabsorbent. The main use for internally cross-linked superabsorbent polymers has been in sanitary articles. Some SAPs may be internally and surface crosslinked. U.S. Pat. No. 7,291,674 to Kang addresses surface cross-linking superabsorbent polymers in order to retain liquid retention, permeability, and gel bed strength when superabsorbent polymer is increased in percent by weight based on the absorbent structure toward usage in sanitary dry articles, the reference being incorporated herein in its entire.

Applicant realized in the inventions as disclosed that Super Absorbent Polymers (SAP), for example Sodium Polyacrylate, have the ability to reduce waste transportation costs by solidifying liquid waste while minimizing an increase in weight and volume. SAPs have the capability of solidifying in some instances and under some conditions up to 300× its weight in water. Applicant's inventions have benefits over other types of conventional waste collection and solidification media in that SAPs chemically bond with water and do not biodegrade and release liquid waste, minimize waste volume, typical expansion is less than 1% and mixes quickly to improve production efficiency and to pass the EPA Test Method 9095 paint filter test, and are approved for landfill use.

One example of the inventions of the present disclosure is directed to a composition including a superabsorbent polymer for solidification of CCRs. The composition may also include a second material. The composition may be a blend of a SAP and a second blend item. A blend may include one or more SAP. A blend may include one or more SAP and another second blend item.

Other examples of the inventions of the present disclosure may be directed to an absorbent structure containing a superabsorbent polymer and/or a superabsorbent polymer blend. Still other embodiments include a moisture absorbent polymer for moisture laden environmental wastes, by way of example CCRs. One example is directed to a moisture absorbent polymer including a SAP, by way of example of crystals of sodium polyacrylate. The polymer may also include other second items, by way of example, in amounts of bentonite clay, Portland cement, and/or wood fibers in a moisture absorbent formulation (MAF).

In some examples, non-polymeric particles may be added to an SAP in order to increase the swellability of superabsorbent polymers. In such an application, gel block may be desired and the particle mixture is designed to achieve gel block as a desired end result. In one example, a composition for solidification of CCR wastes in contaminated sites includes a super absorbent polymer and a non-polymeric particle, in amounts to solidify the contaminates so as to pass the paint filter test.

Additionally, the absorbent composition may include a sanitizer. The sanitizer may be granular chlorine.

In other embodiments, the inventions of the present disclosure may include a method of solidifying CCRs. In yet other embodiments, the inventions of the present disclosure may include a method of making a composition for solidification of CCRs.

CCR may often require extraordinary removal measures, being upwards of >50% moisture and often requiring either wet evacuation or dredging prior to either dewatering or solidification. A bench-scale evaluation of multiple grades of blends including SAP was undertaken to achieve balance of cost and performance measures in treating CCR waste. Five wet CCR waste samples (Ash C, Ash A, Ash M1, Ash M2, and Ash U) were secured from different power utilities' CCR ponds. The water content at which the fly ash samples fail a paint filter test were measured. Example blends, including SAP, were tested for pre- and post-moisture content, specific gravity, bulk density, Vane Shear, Undrained Cyclic Triaxial Testing and Unconfined Compressive Strength. SAPs were tested, by way of example, ZapZorb SAP (available from Zappa Tec in McLeansville, N.C.) in differential blends, by way of example, as below were tested:

Sample 1 (P100) included 100% SAP.
Sample 2 (P2) included a ZapZorb P2 Formulation—50% ZapZorb SAP+50% Bentonite.
Sample 3 (P4) included a ZapZorb P4 Formulation—50% ZapZorb SAP+25% Bentonite +25% Portland Cement.
Sample 4 (P6) included a ZapZorb P6 Formulation—75% ZapZorb SAP+8% Portland Cement +8% Bentonite +8% wood flour.
Sample 5 (PP) included Power Pellets formation comprising—5% ZapZorb SAP+95% wood pellets.
Sample 6 (P7) included 75% wood four+25% P100 ZapZorb SAP.

In the samples above, Samples 1, 2, and 3 were evaluated at least at 1% and 2% of dry mass fraction of fly ash; Sample 5 was evaluated at least at 2%, 4% and 6% of dry mass fraction of fly ash; and Sample 6 was evaluated at least at 2% and 4% of dry mass fraction of fly ash.

In one example, Fly Ash samples were tested at 70% water content and observed to fail the Paint Filter Test. Fly Ash samples were comparatively tested at 70% water content with 1% SAP added and observed to pass the Paint Filter Test.

In some examples, the inventions of the present disclosure include a solidification system for environmental waste solidification. The solidification system includes a blend including an absorbent polymer. The absorbent polymer may include SAP. The SAP may be granular. The SAP may be loose and dispensed from a bottle and/or a container. The SAP may be housed in a packet. The packet may be configured to allow liquid penetration. The packet in some examples may be made of dissolvable polyvinyl alcohol and/or any other suitable water soluble film. It can be challenging to arrive at a compatible packet with both the contents and the environment in which it will be dissolved. Examples of such compatible packets are dissolvable films that can be acquired from MonoSol, LLC, such as their models M7031, M7061, M8534, and M8900 (PXP6829) of water soluble film. Optionally, water soluble paper may be used. Packets may be made entirely of a dissolvable packet and/or may include a dissolvable portion. The liquid solidifier may initially be located within the packet and includes a plurality of surface cross-linked superabsorbent polymer particles. The blend may also include a second item. The second item, by way of example, may be bentonite, Portland cement, wood flour, power pellets, and/or a combination of any or all. The absorbent composition may include a solidification of the desired materials. The solidification may be a firm solidification according to passage of Paint Filter Testing. The blend may be considered a solidification blend. The blend may solidify a waste to a wetted solid state, the solid state of the waste being a non-flowing solid solidified from a flowable slurry state.

Test Methods/Testing Examples

Mineral Processing Services's (www.mpsmaine.com) full-scale specialized SmartFeed™ sequential mixer/blending unit is capable of metering in a >1%, by way of example, ZapZorb admixture, homogenizing/conditioning and stockpile discharging amended CCR waste or dredged sediment at between 50-100 tons/hr per unit—dependent upon material consistency and % moisture. Testing shows that the duration of the sequential blending of a 65% moisture CCR slurry to a solidified CCR matrix passing EPA Paint Filter criteria is as low as 3 minutes.

Advantages of blending low admixture, by way of example, as low as 0.5% ZapZorb admixture with the CCR waste and/or dredged sediment material includes improved assurance of passing EPA Paint Filter Test within 3 minutes of blending (expediting direct load-out without the need for interim stockpiles and rehandling expenses) and ensures no free liquids are generated during OTR/rail transport prior to arrival at the final destination.

Also, advantages include significant improvement in Unconfined Compressive Strength of the ZapZorb amended material for either support of a final closure cap or to be bladed-out and compacted within a mono-fill. Cost savings and time savings for the applications included herein, in some examples, of 0.5% SAP blend for CCR solidification may be dramatic cost reductions, shortened project schedules and minimizing of volume of CCR waste for transportation and storage.

The five coal fly ash samples from CCR ponds were secured from locations in the southeastern portion of the U.S. and the water content at which the fly ash samples fail the paint filter test were measured. The gravimetric water contents at which the ashes failed the paint filter test ranged from 55% to 70% reported on dry basis. The MAFs were added to the ashes at water content that was 5% more than the water content at which the ash failed the paint filter test, as seen below:

TABLE 1

Materials Used - Fly Ash

1. Fly Ash C (mwc[1] = 70%; $\gamma_d$ = 60 lbs/ft$^3$)
2. Fly Ash A (mwc[1] = 65%; $\gamma_d$ = 50 lbs/ft$^3$)
3. Fly Ash M1 (mwc[1] = 60%; $\gamma_d$ = 54-58 lbs/ft$^3$)
4. Fly Ash M2 (mwc[1] = 58%; $\gamma_d$ = 55-58 lbs/ft$^3$)
5. Fly Ash U (mwc[1] = 70%; $\gamma_d$ = 44-50 lbs/ft$^3$)

[1]mwc = molding water content is gravimetric water content on dry basis

The MAF was thoroughly mixed with the wet ash and samples were compacted using modest compaction effort in a Proctor Compaction mold and a Harvard Miniature mold. After addition of the MAF, and when there was no visible water, the ash and all ash samples passed the paint filter test. The compressive and shear strengths of the samples were measured using pocket penetrometer, Torvane, and using the Unconfined Compression test device. A majority of the samples passed the paint filter test within 15 minutes after mixing the MAF. All samples showed modest to substantial increase in compressive strength (See FIG. 1). The compressive strength increased from being zero when the sample was in liquid state to up to 3 psi when one of the MAFs was added.

Figure 12:
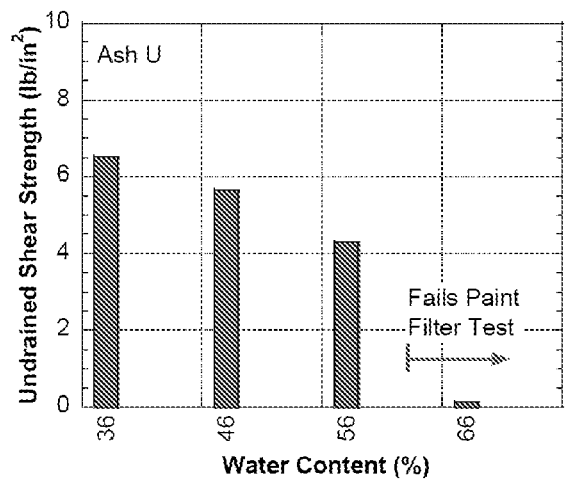
FIG. 12 is a graph illustrating shear strength as a function of water content.

Shear strength as a function of water content was prepared as shown in FIG. 12.

Pocket Penetrometer (4"×4" Sample with 15 mm foot) compacted using Proctor Compaction mold with Standard Proctor Hammer, 3 lifts, 10 blows/lift.

Torvane testing (4"×4" Sample with Largest vane) compacted using Harvard Miniature Compactor with 20 lb Spring Hammer, 3 lifts, 12 blows/lift.

Unconfined Compression Testing (1.25"×2.8 " Sample) with unconfirmed sample preparation and extrusion completed using Harvard Miniature Mold. Unconfined compression sample preparation and extrusion testing using Harvard Miniature Mold.

EXAMPLES

Some embodiments of the inventions of the present disclosure are further illustrated by the following examples, not construed to be limiting in any way and are only exemplary thereof.

In some examples, the composition is considered the SAP mixture of Sample 1, Sample 2, Sample 3, Sample 4, Sample 5, and/or Sample 6, individually and/or in combination.

In some examples, the CCR Samples were tested and found as failing a Paint Filter Test in their natural state. The samples were evaluated for moisture in the Ash samples and a determination of the water content at which each of the ash samples failed the paint filter test.

The Specific Gravity of the CCR samples was as shown in TABLE 3 below:

TABLE 3

Specific Gravity of Fly Ash Samples
Specific Gravity - Fly Ash

1. Fly Ash C (G = 2.391)
2. Fly Ash A (G = 1.801)
3. Fly Ash M1 (G = 2.327)
4. Fly Ash M2 (G = 2.238)
5. Fly Ash U (G = 2.073)

Figure 2:
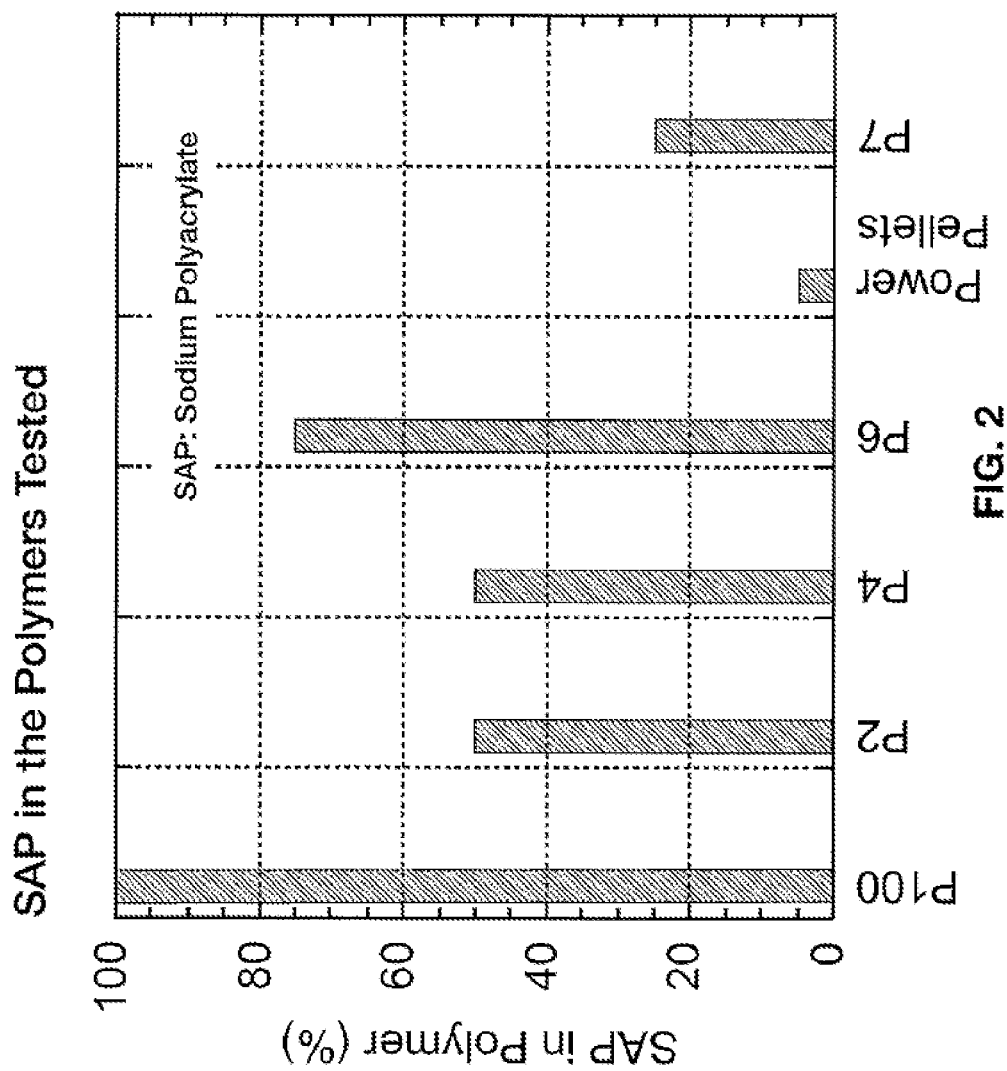
FIG. 2 shows one example of the amount of SAP in each composition tested.

FIG. 2 demonstrates the amount of SAP in the polymer samples tested.

Pre-determined mass fractions of SAPs in compositions/blends were added to CCR samples and evaluated for Paint Filter Test values, undrained cohesion and shear strengths.

In some examples, the Ash Samples at 70% water content was demonstrated failing a Paint Filter Test. Fly Ash at 70% water content+1% SAP was demonstrated passing the paint filter test.

Figure 3A:
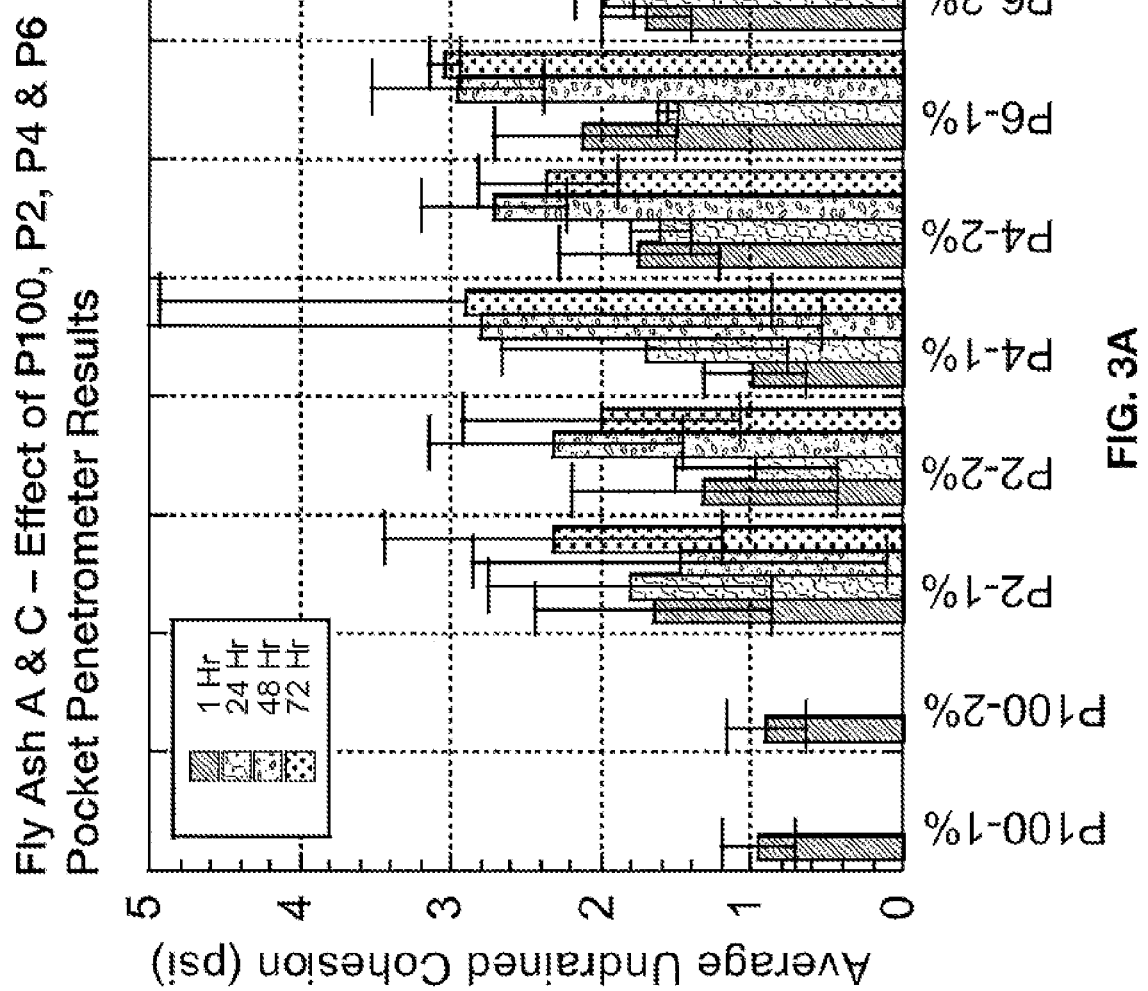
FIG. 3A-C are exemplary testing results of Fly Ash exposed to an SAP material as disclosed herein.
Figure 3B:
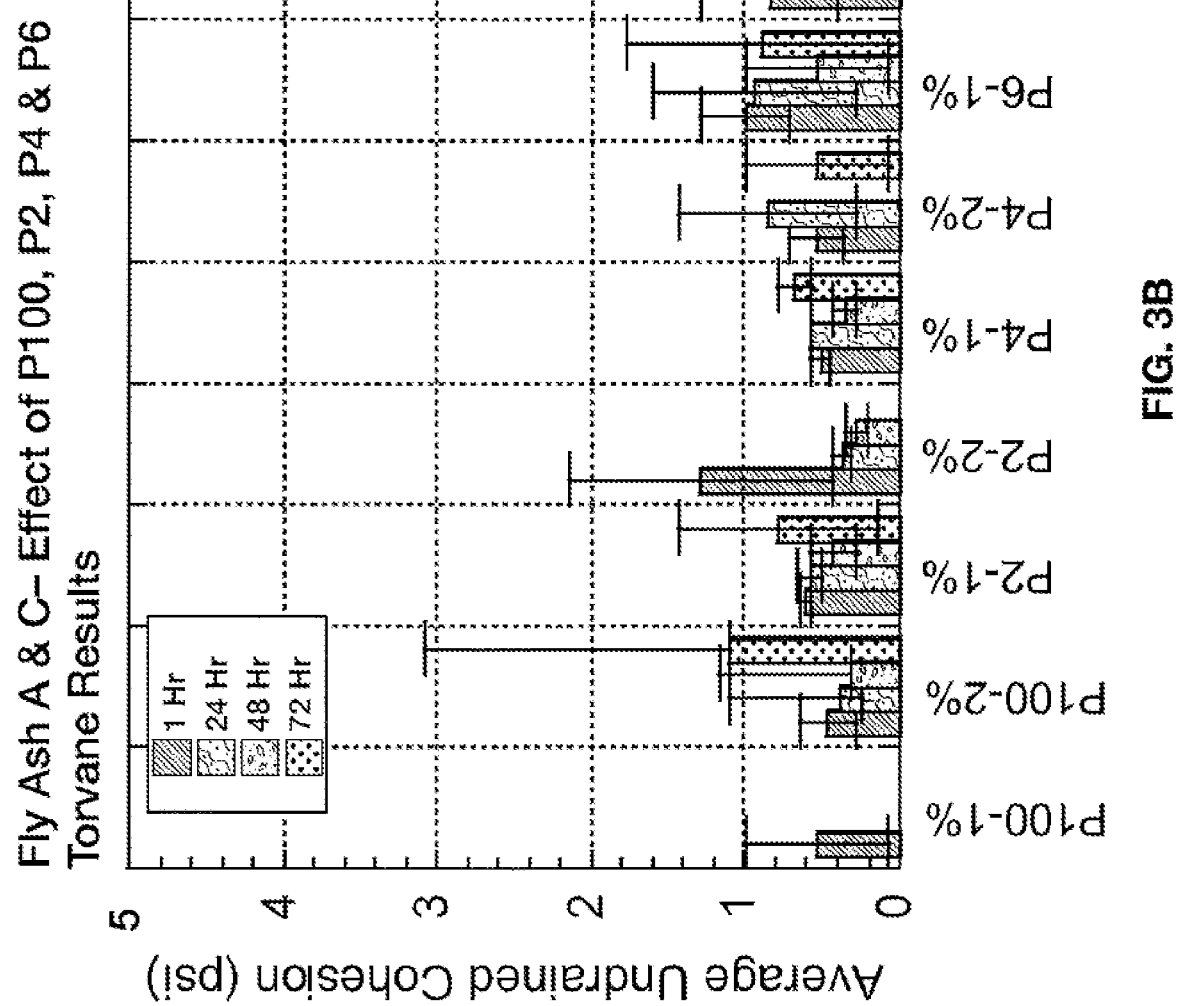
Figure 3C:
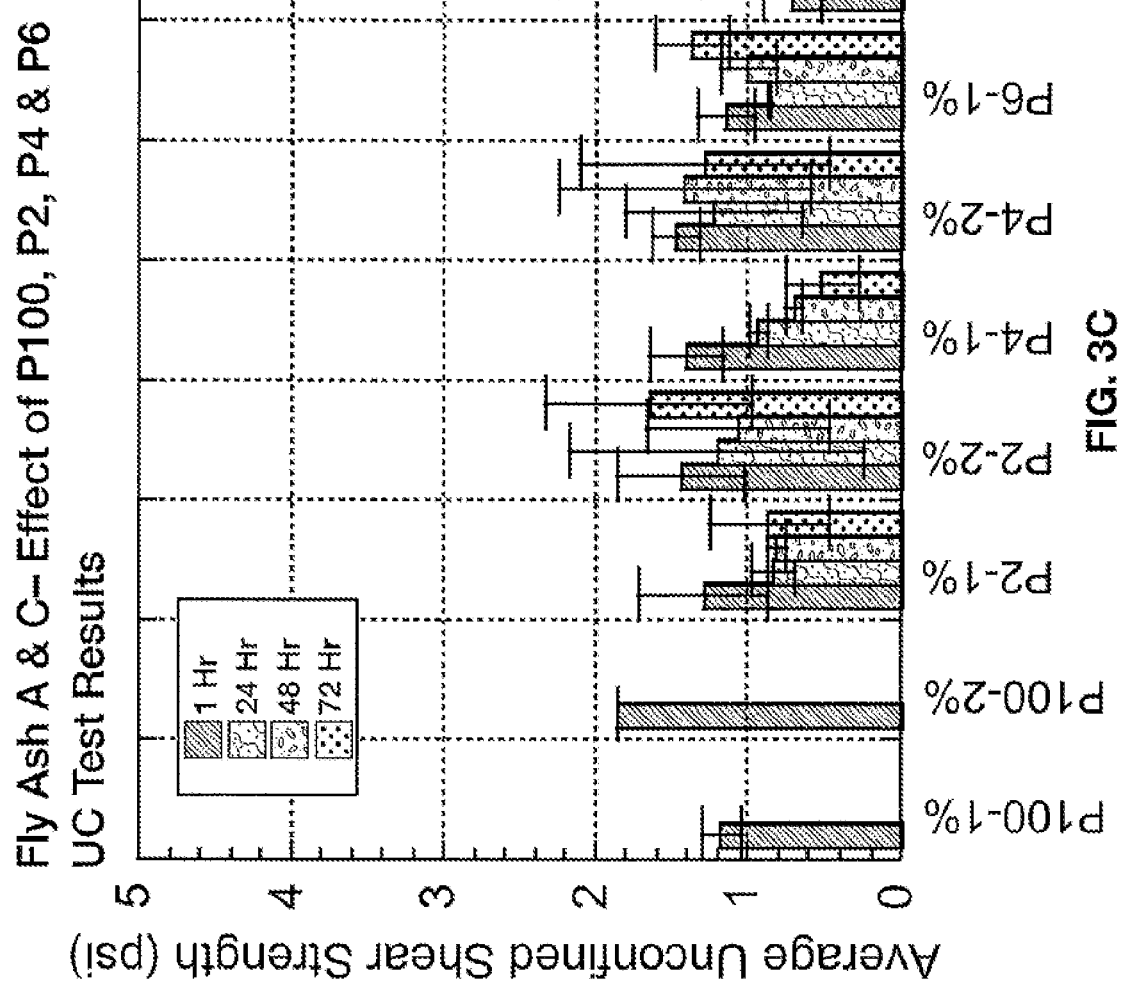

In one example, FIGS. 3A-C show Fly Ash A and C with application of Examples P100, P2, P4 and P6, individually. FIG. 3A shows specifically the Pocket Penetrometer Result, indicating Average Undrained Cohesion (psi) at 1 and 2% example addition. FIG. 3B shows the Torvane Testing result with Average Undrained Cohesion (psi) at 1% and 2% example addition. FIG. 3C shows the effect of addition of at 1% and 2% of the various example SAPs on average unconfined shear strength (psi) at 1 hour, 24 hours, 48 hours and 72 hours.

Figure 4A:
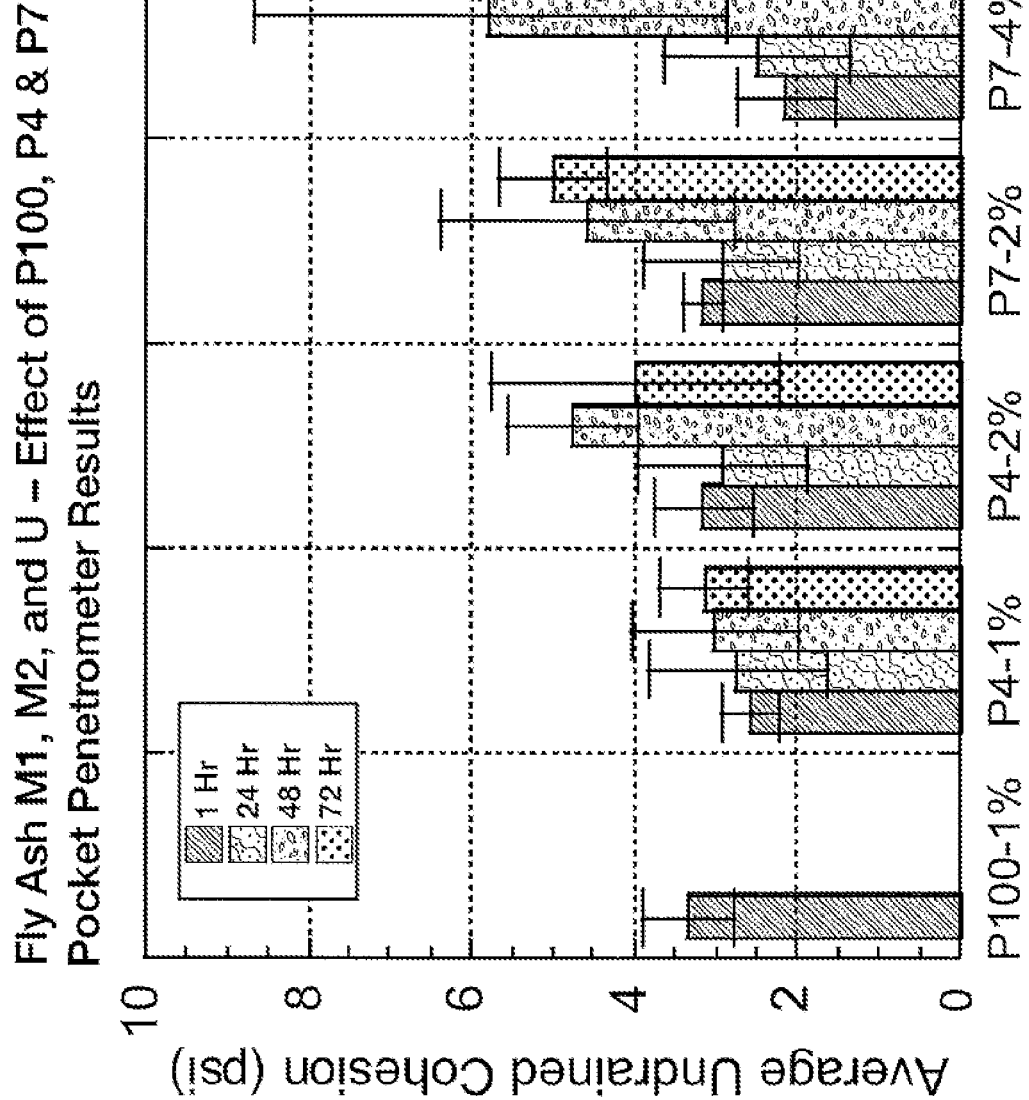
FIG. 4A-C are graphs of exemplary Fly Ash samples exposed to composition samples in time increments as evaluated by pocket penetrometer, torvane testing, an unconfined compression testing results according to examples of the present disclosure.
Figure 4B:
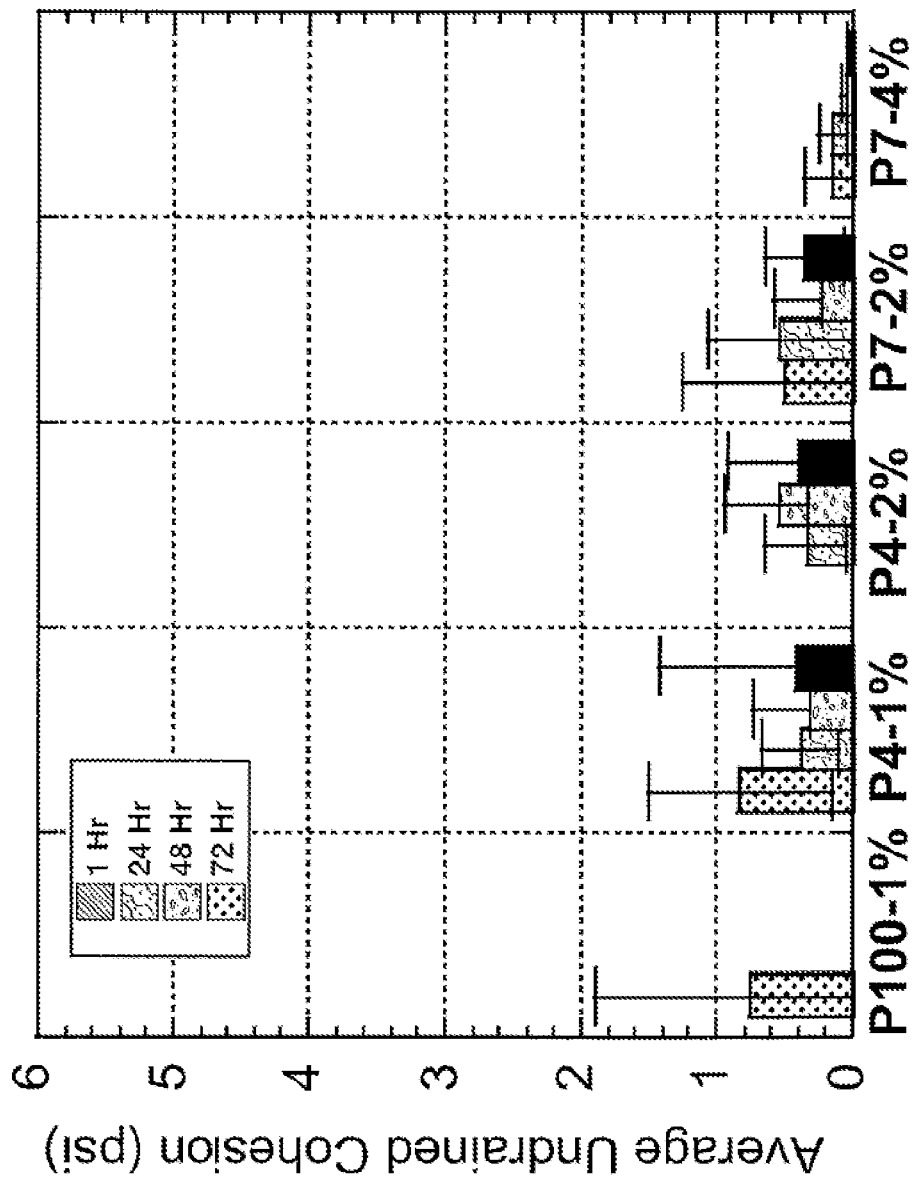
Figure 4C:
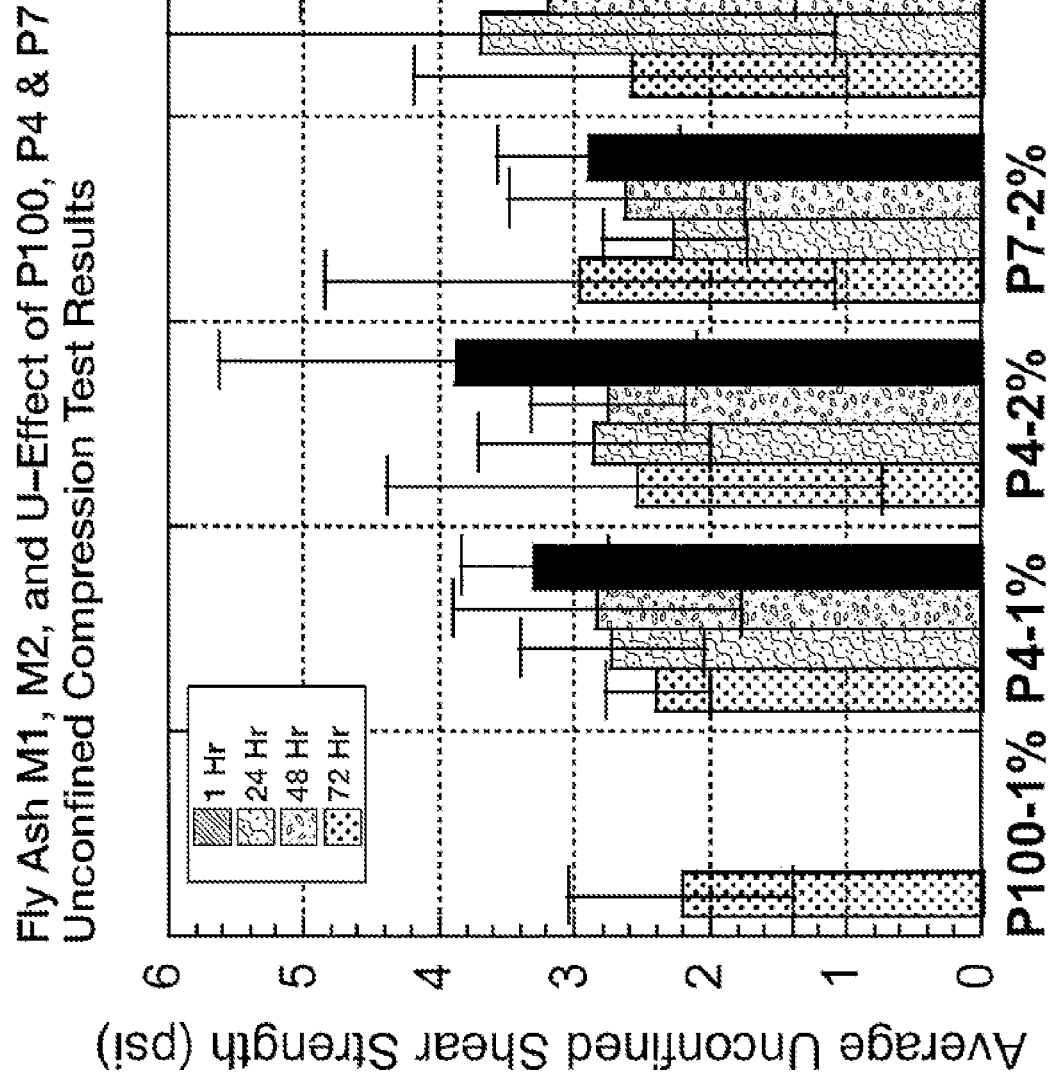

Other examples, in FIGS. 4A-4C show Fly Ash M1, M2 and U with application of Samples 1-P100, 3-P4, and 6-P7, individually. FIG. 4A shows specifically the Pocket Penetrometer Result, indicating Average Undrained Cohesion (psi) at 1%, 2% and 4% example addition. FIG. 4B shows the Torvane Testing result with Average Undrained Cohesion (psi) at 1%, 2% and 4% example addition. FIG. 4C shows the effect of addition of at 1%, 2% and 4% of the various example SAPs on average unconfined shear strength (psi) at 1 hour, 24 hours, 48 hours and 72 hours.

Figure 5A:
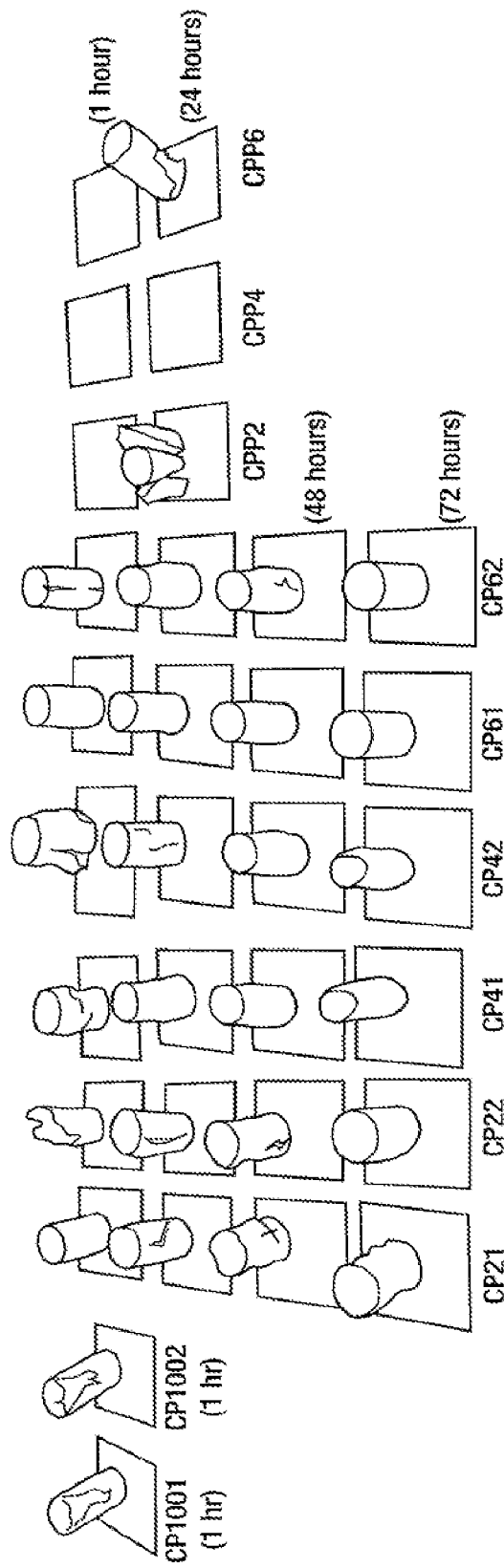
FIG. 5A-B show exemplary Fly Ash samples after US testing.
Figure 5B:
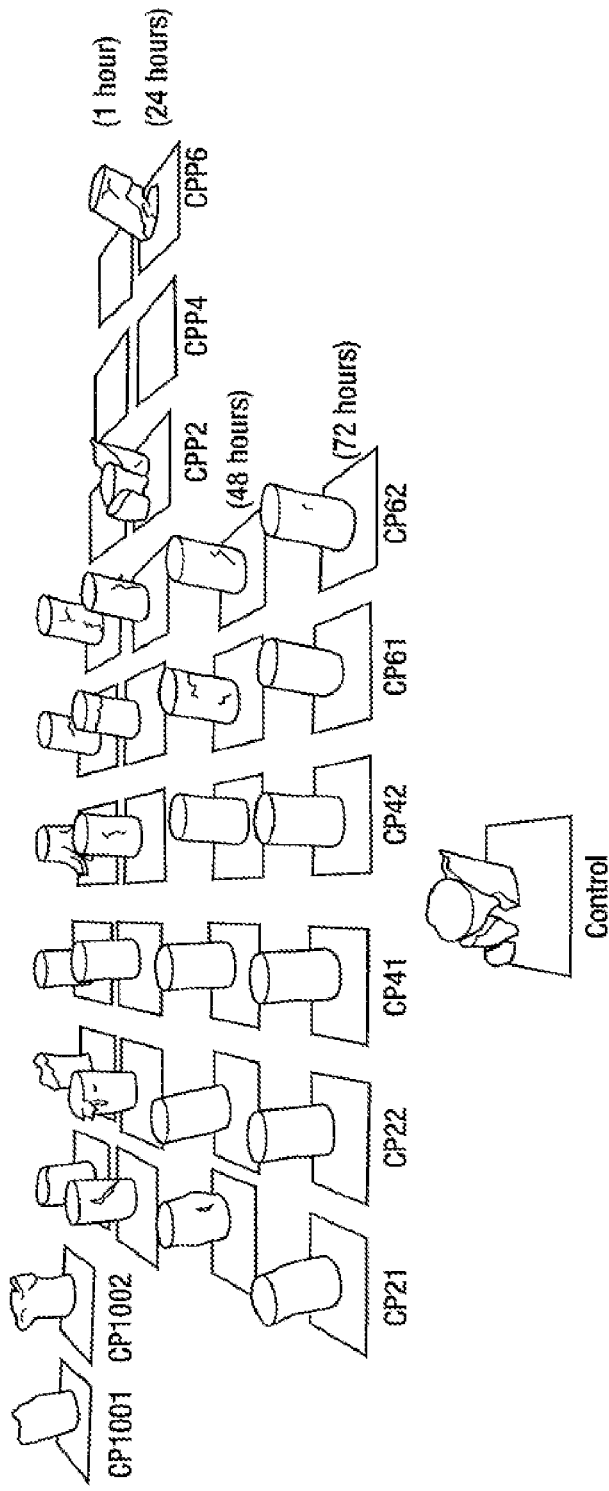

FIG. 5A-5B illustrate Fly Ash A and Fly Ash C Samples after Unconfined Compression testing.

Figure 6A:
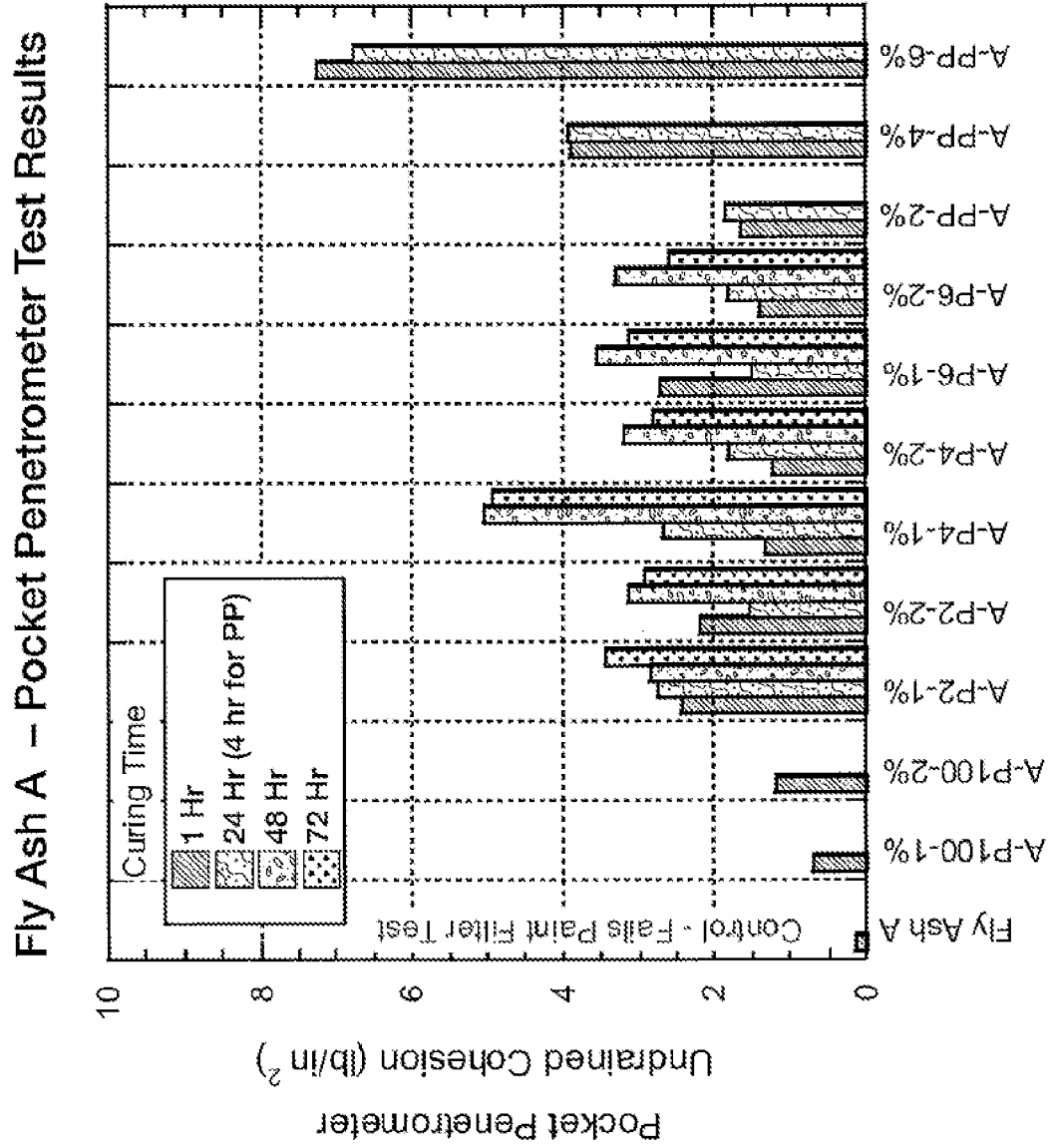
FIG. 6A-C are graphs of exemplary Fly Ash samples exposed to composition samples in time increments as evaluated by pocket penetrometer, torvane testing, an unconfined compression testing results according to examples of the present disclosure.
Figure 6B:
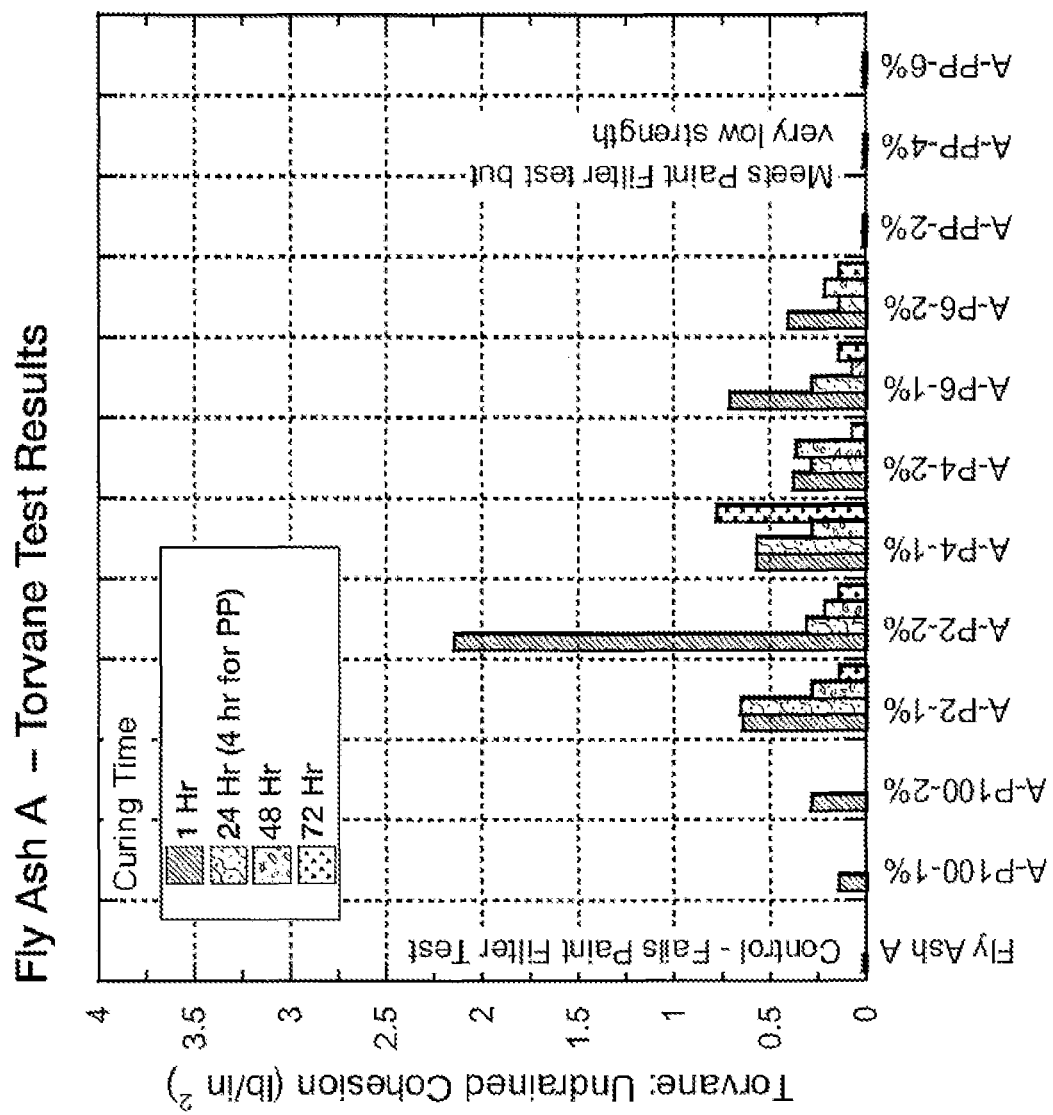
Figure 6C:
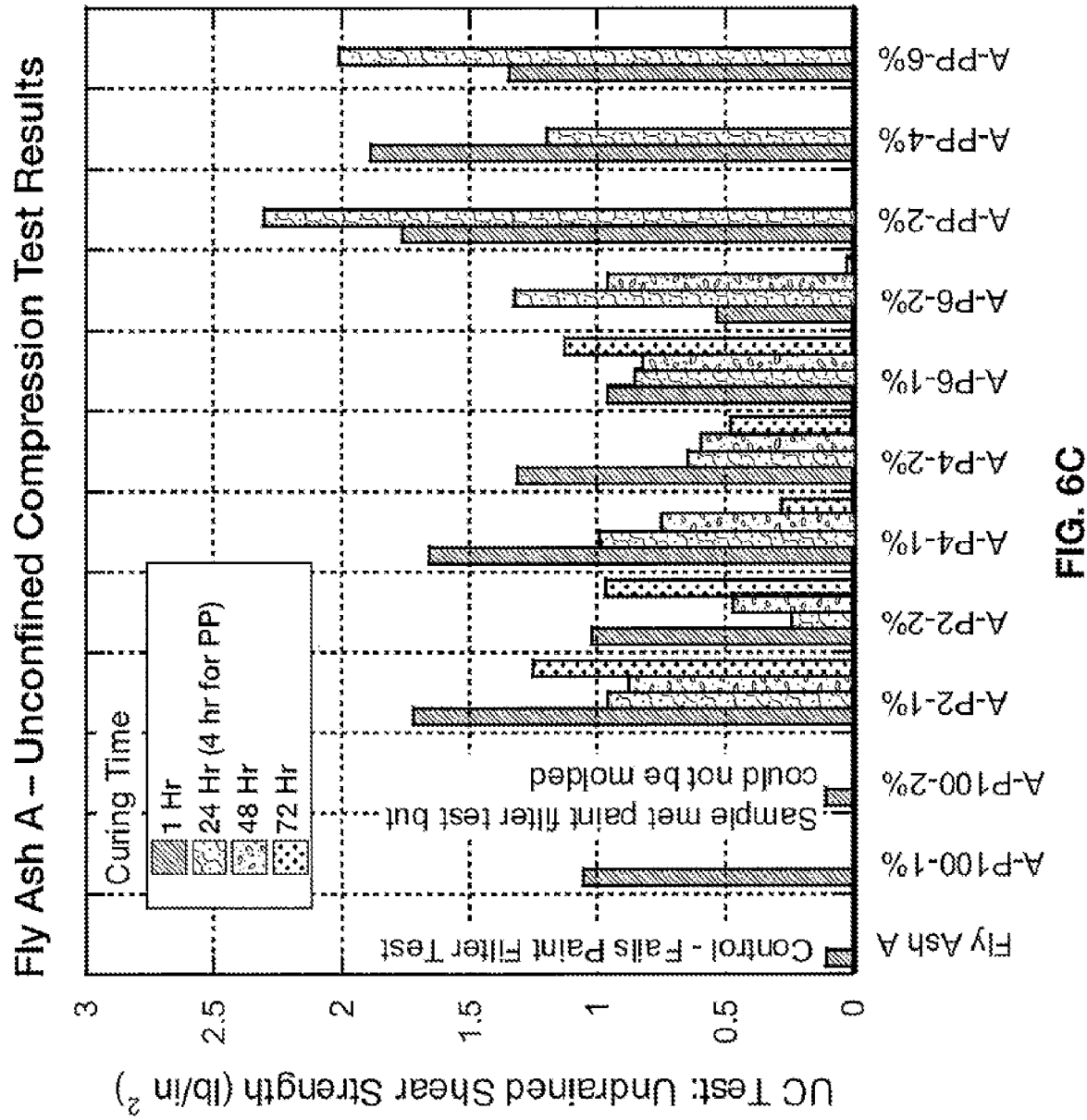

FIGS. 6A-6C illustrate Sample Fly Ash A exposed to Examples 1-5. All results with examples SAP addition performed better under Pocket Penetrometer testing. Examples 2, 3, and 4 performed at higher level under Torvane Testing (see FIG. 6B) and 2, 3, 4 under Unconfined Compression Testing over longer periods of time.

Figure 7A:
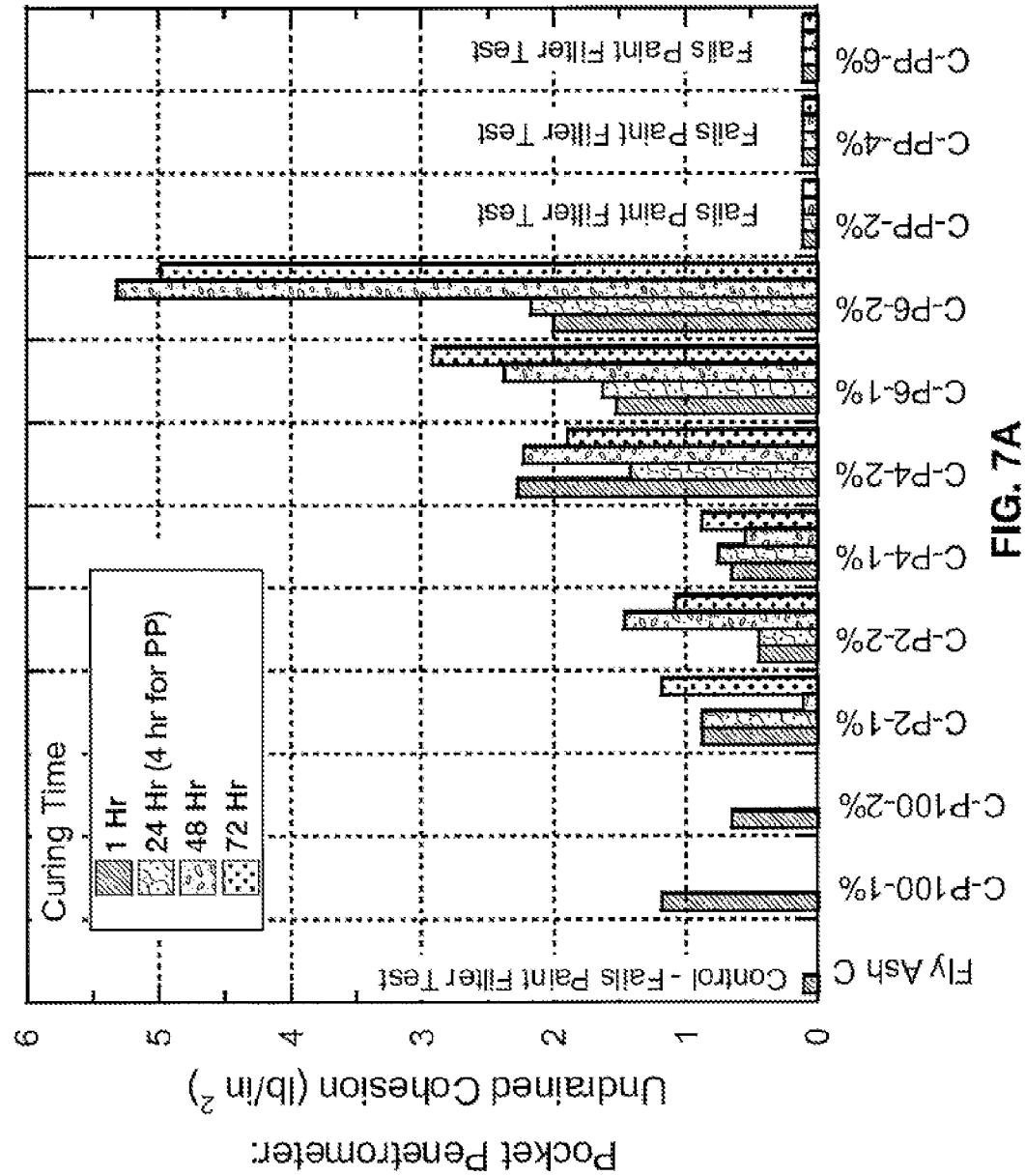
FIG. 7A-C are graphs of exemplary Fly Ash samples exposed to composition samples in time increments as evaluated by pocket penetrometer, torvane testing, an unconfined compression testing results according to examples of the present disclosure.
Figure 7B:
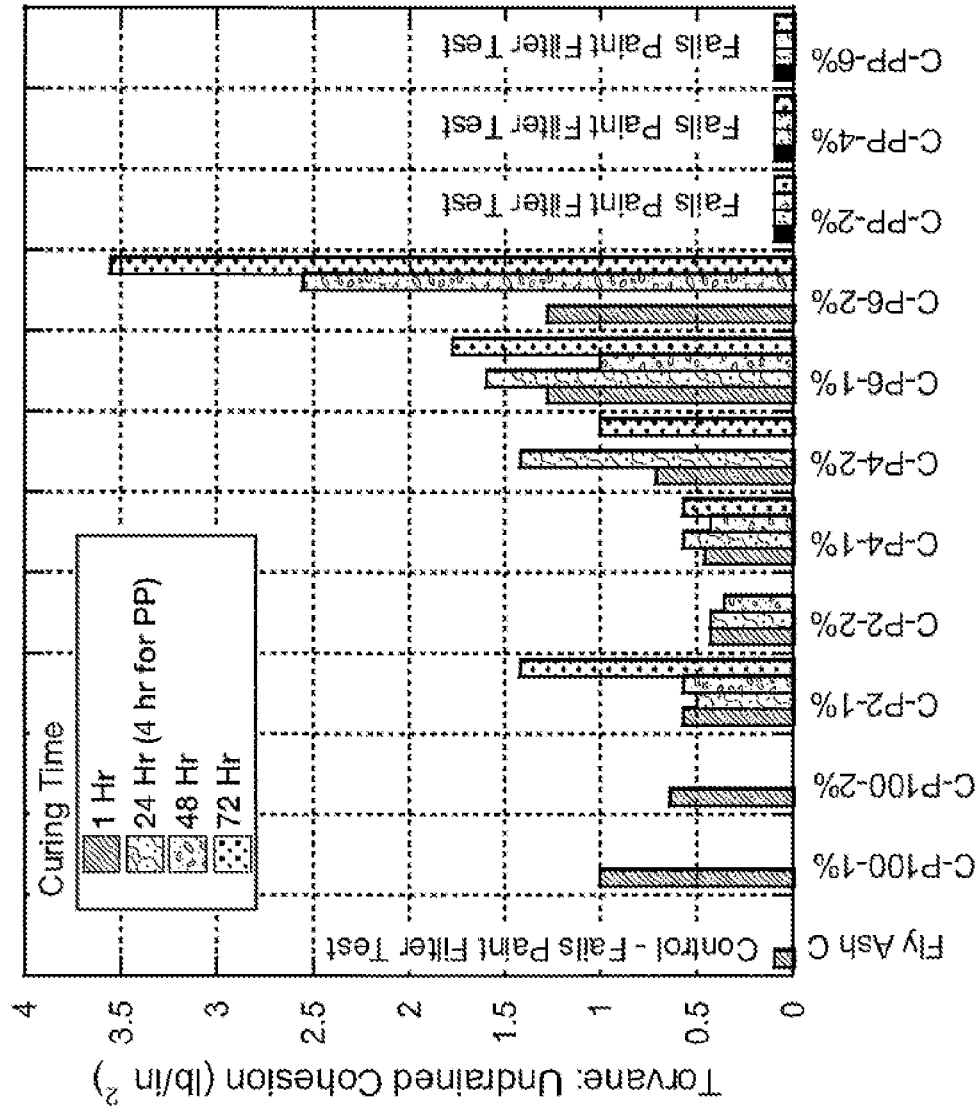
Figure 7C:
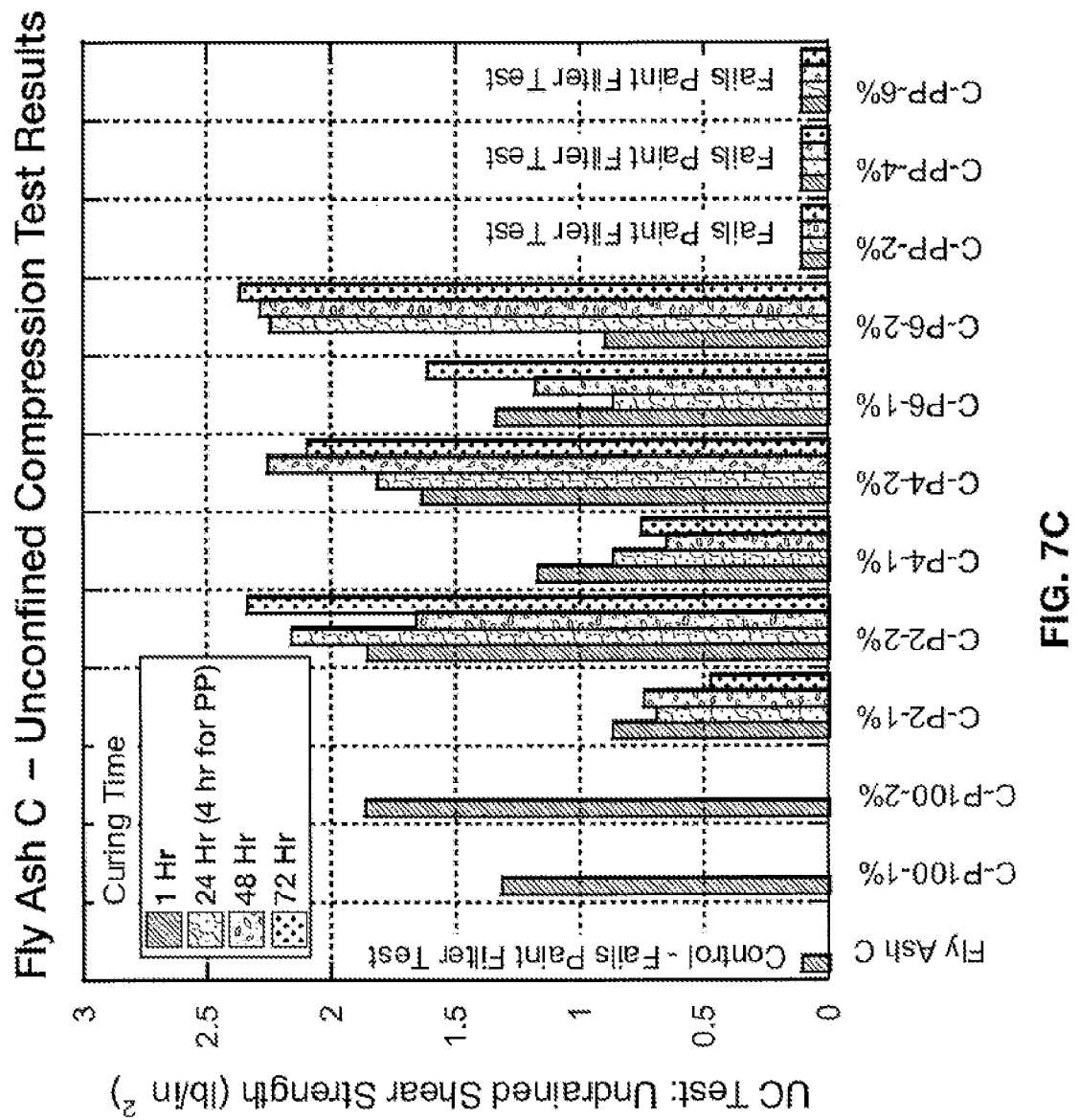

FIGS. 7A-7C illustrate Sample Fly Ash C exposed to Samples 1-5. Samples 1-4 resulted in examples where SAP addition performed better under Pocket Penetrometer testing. Samples 1, 2, 3, and 4 performed at higher level under Torvane Testing (see FIG. 7B) and also under Unconfined Compression Testing over longer periods of time.

Figure 8A:
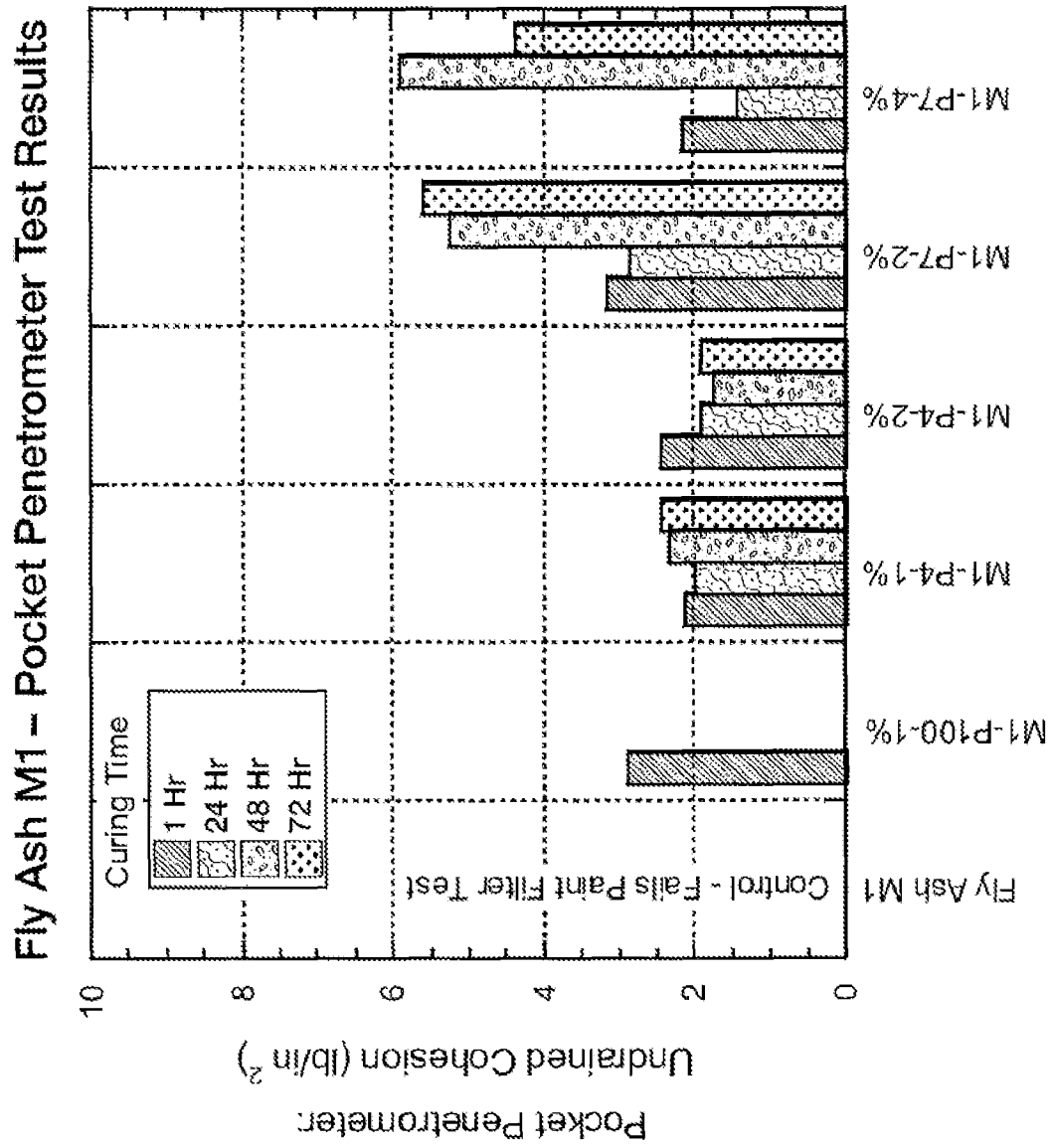
FIG. 8A-C are graphs of exemplary Fly Ash samples exposed to composition samples in time increments as evaluated by pocket penetrometer, torvane testing, an unconfined compression testing results according to examples of the present disclosure.
Figure 8B:
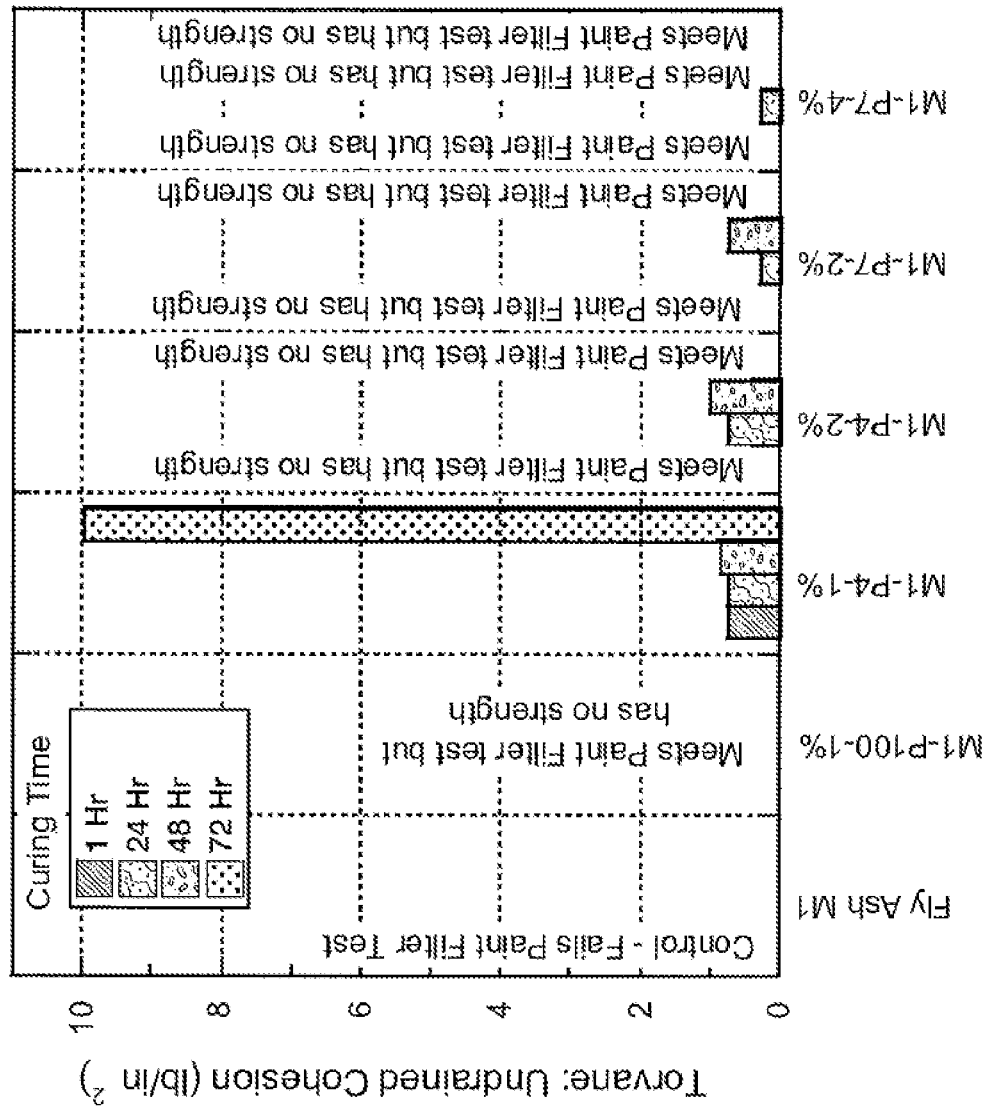
Figure 8C:
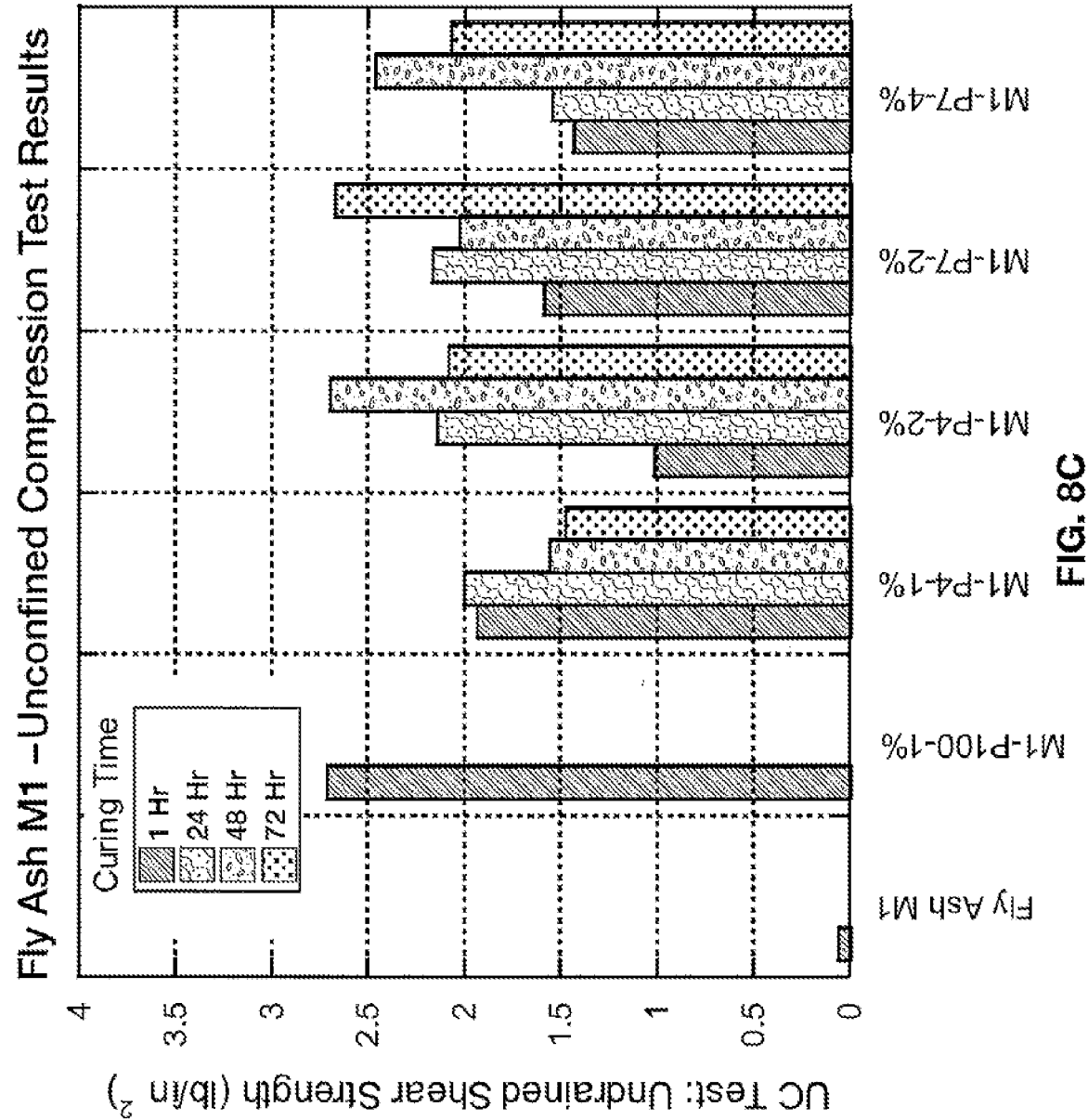

Sample Fly Ash M1 is shown exposed to Samples 1, 3 and 6 in FIGS. 8A-8C. Examples 1, 3 and 6 resulted in examples where SAP addition performed better under Pocket Penetrometer testing. Sample 3 performed at a higher level under Torvane Testing (see FIG. 8B) with 3 and 6 performing highest under Unconfined Compression Testing over longer periods of time.

Figure 9A:
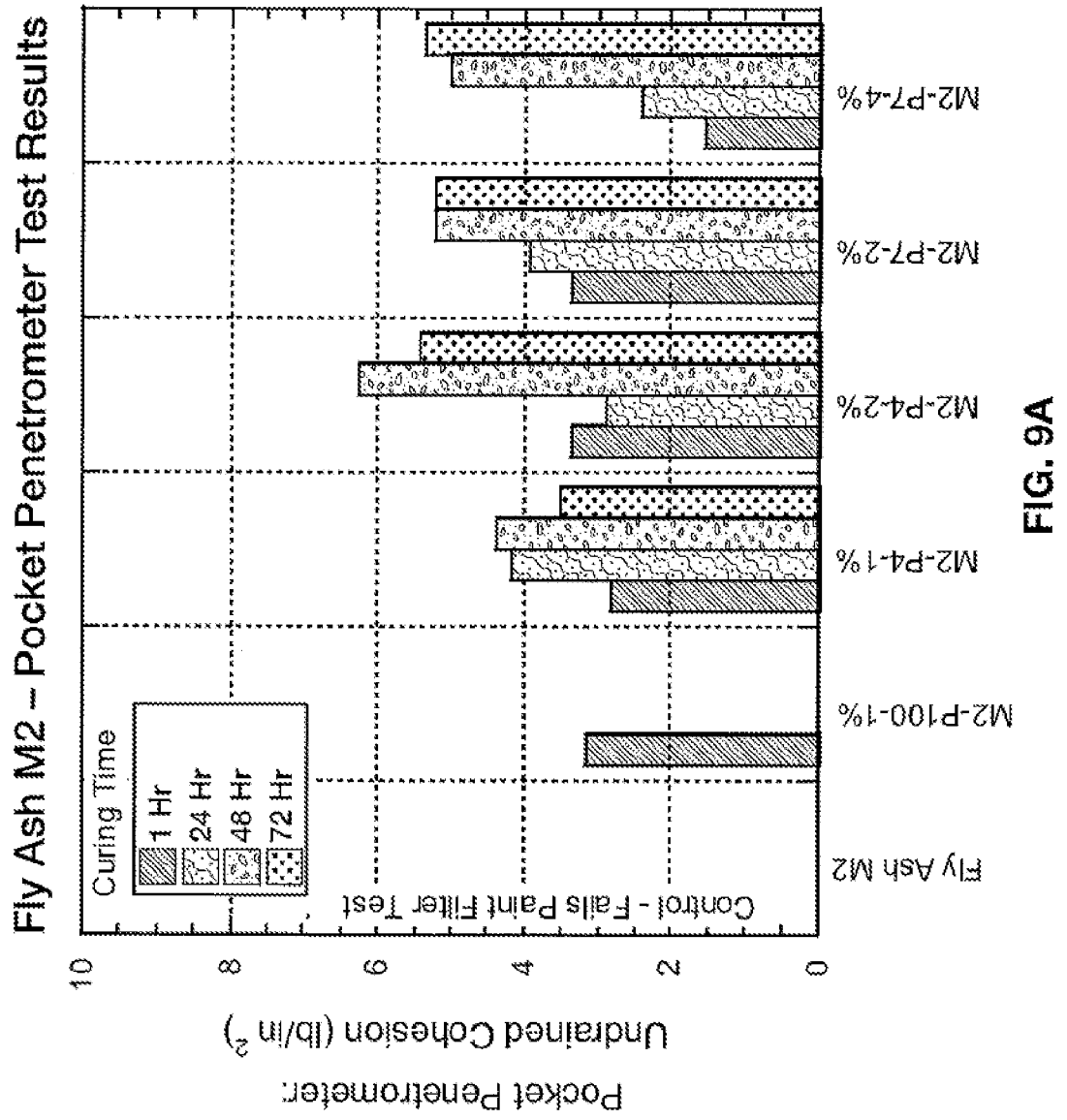
FIG. 9A-C are graphs of exemplary Fly Ash samples exposed to composition samples in time increments as evaluated by pocket penetrometer, torvane testing, an unconfined compression testing results according to examples of the present disclosure.
Figure 9B:
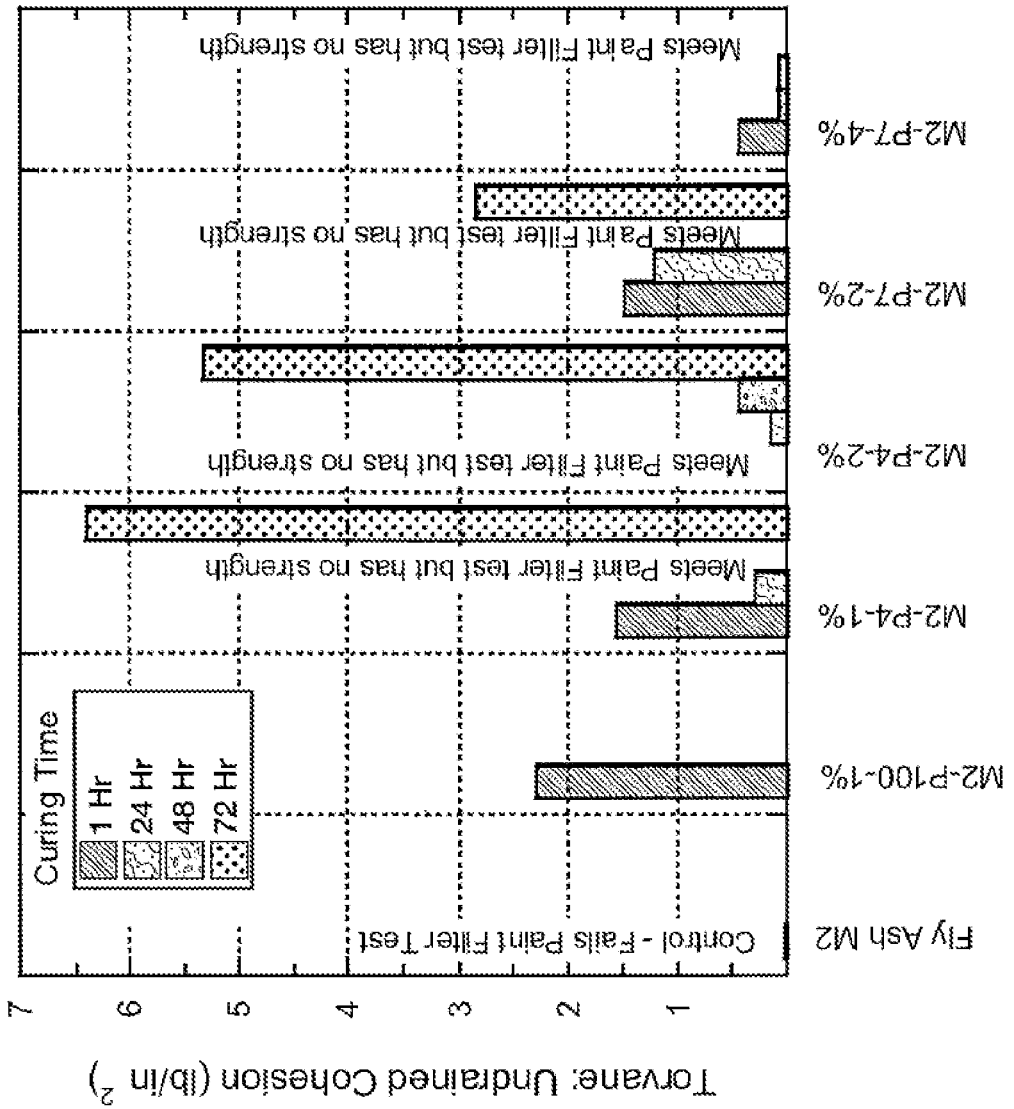
Figure 9C:
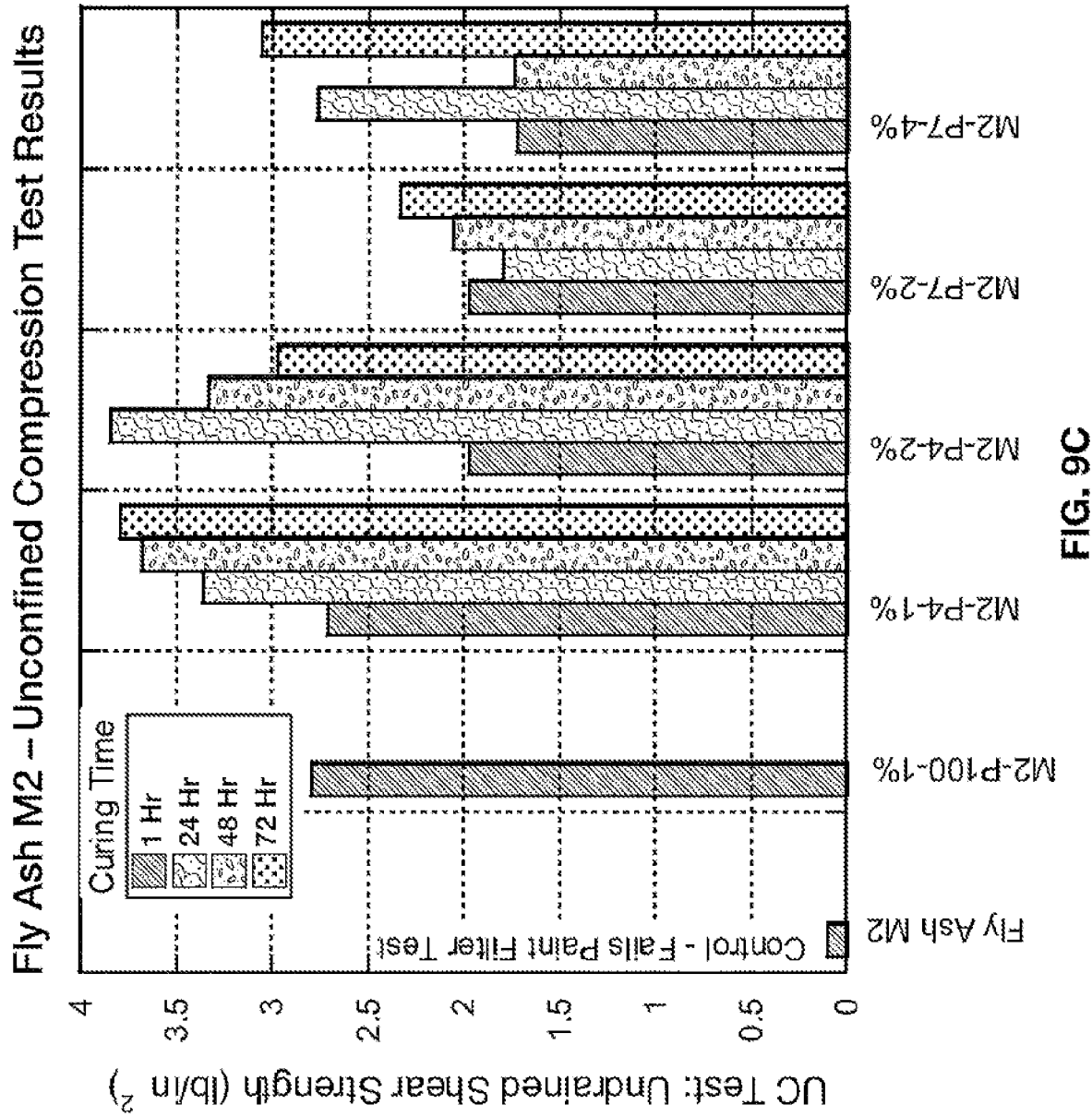

FIGS. 9A-C illustrate Sample Fly Ash M2 exposed to Samples 1, 3 and 7. All samples resulted in examples where SAP addition performed better under Pocket Penetrometer testing. Various examples performed better at differing interval under Torvane Testing (see FIG. 9B) and all examples performed better under Unconfined Compression Testing over all time periods.

Figure 10A:
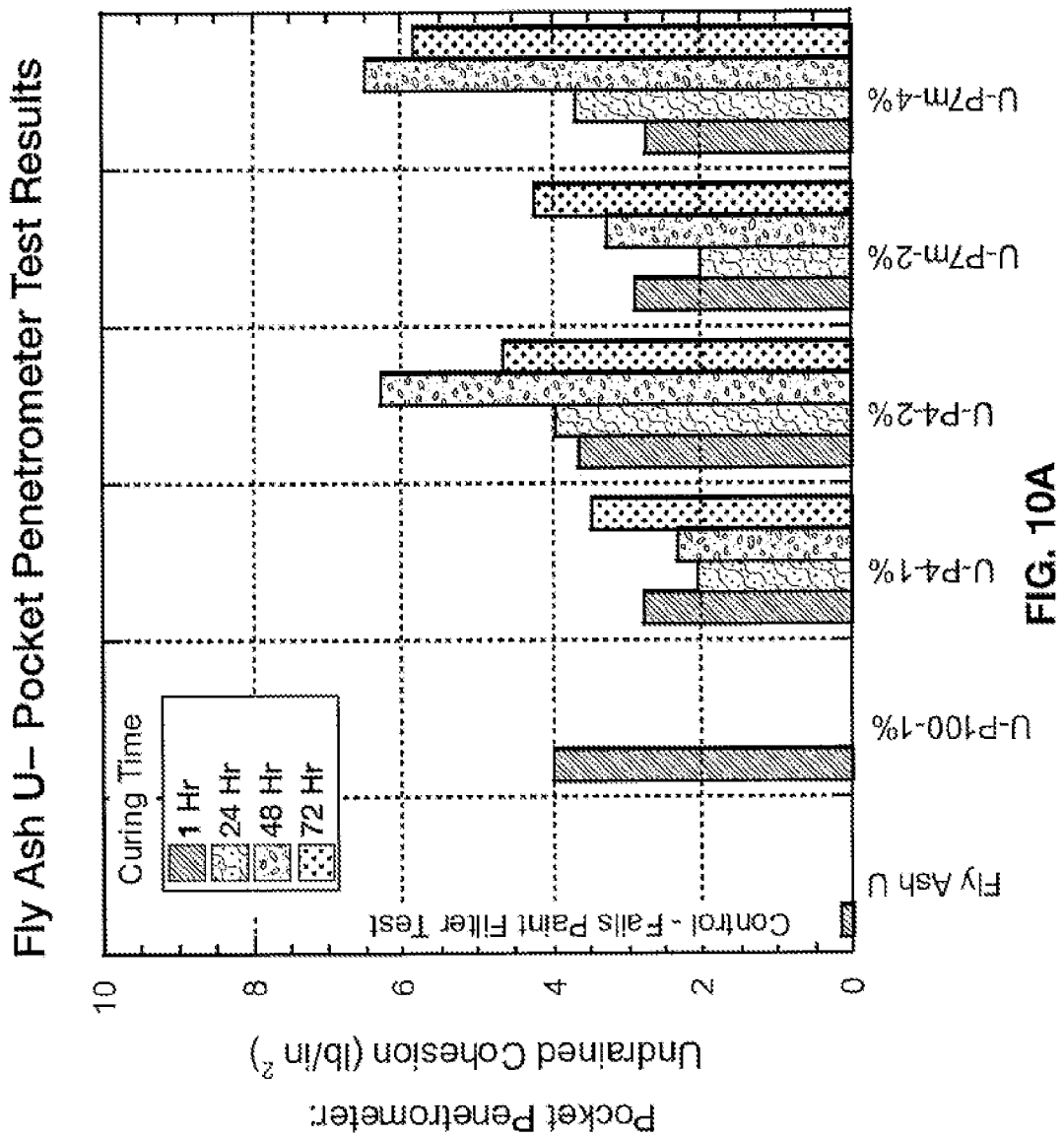
FIG. 10A-C are graphs of exemplary Fly Ash samples exposed to composition samples in time increments as evaluated by pocket penetrometer, torvane testing, an unconfined compression testing results according to examples of the present disclosure.
Figure 10B:
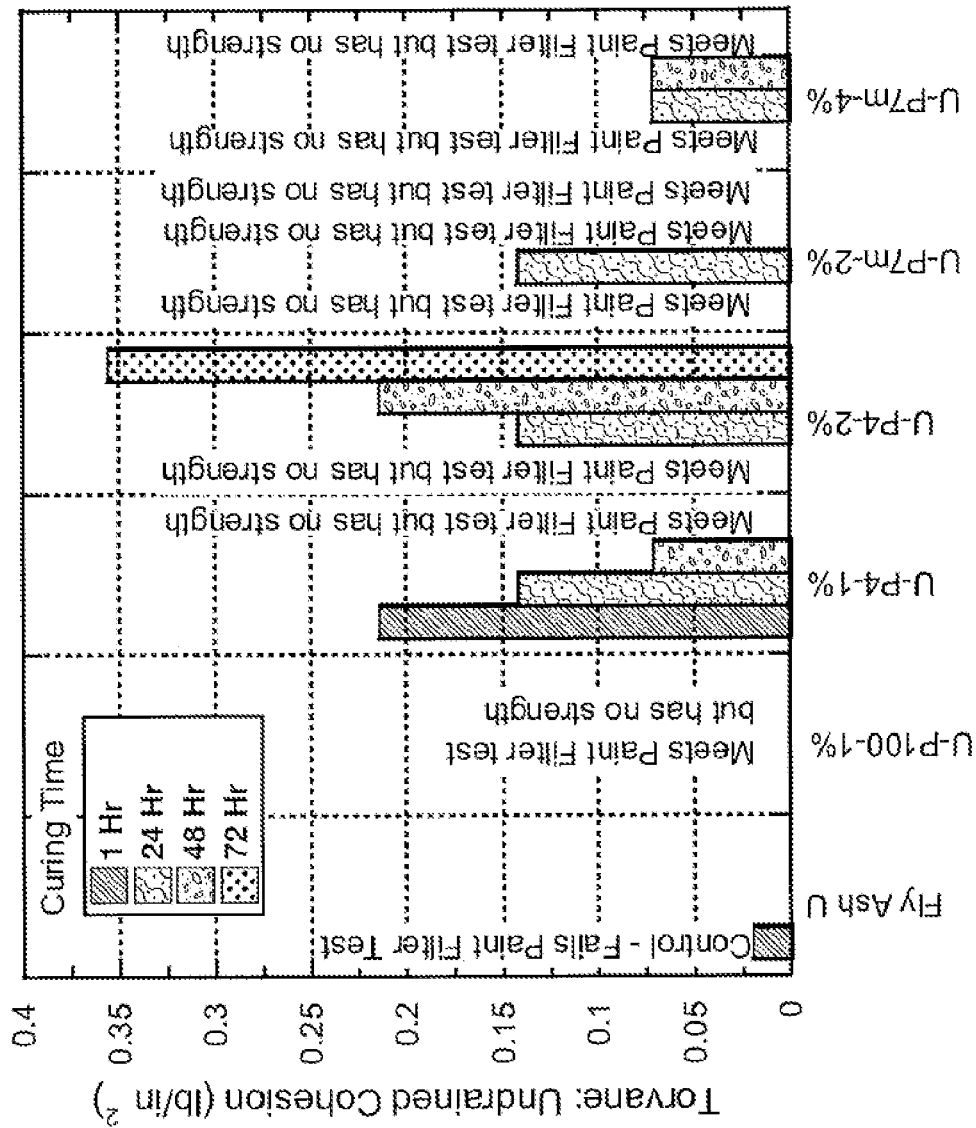
Figure 10C:
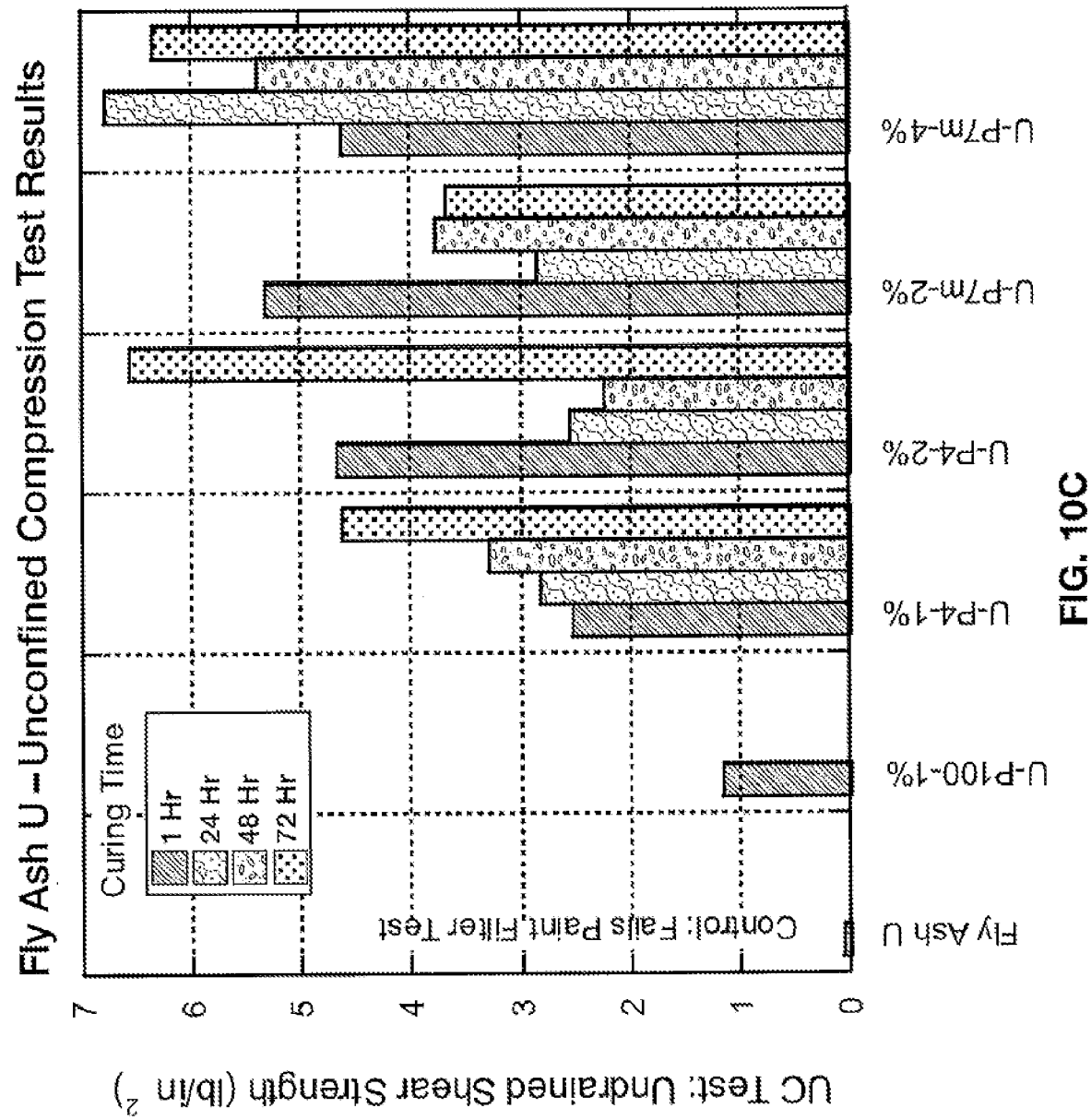

FIGS. 10A-C illustrate Sample Fly Ash U exposed to Samples 1, 3 and 7. All samples resulted in examples where SAP addition performed better under Pocket Penetrometer testing. Sample 3 performed best at all time intervals under Torvane Testing (see FIG. 10B) and all samples performed better under Unconfined Compression Testing over all time periods.

All Fly Ash Samples are concurrently shown in FIG. 11 for Undrained Shear Strength when exposed to Samples 1, 3 and 6.

As little as 0.5% of SAP by dry weight was sufficient to stabilize the moisture in fly ash containing as high as 70% water. All example SAPs stabilized free water and the strength improved from a material that is at liquid limit to a material that can stand at undrained shear strength ranging from 2 to 10 psi. P2, P4 and P7 examples provided the most strength for the amount of SAP they contained, respectively.

Applicant's inventions indicated a noticeable increase in stability, compressive strength and shear strength. Surprisingly, the percentage of SAP in some instances was able to be reduced to less than one (1) percent and still maintain substantially the same stability, compressive strength and/or shear strength. Even more surprising, in some instances, the strength and stabilization of the saturated fly materials actually increased with the lower percentage of SAP.

In other examples, full-scale blending operational parameters for the addition of SAP into a 65% moisture CCR slurry, showed that the addition of low-speed blending of 0.3% SAP was sufficient to solidify a CCR slurry in 3 minutes meeting EPA Paint Filter Criteria for no free liquids. With such a lower percentage of the SAP, a blend can be applied, by way of example, at 60 to 90 cubic yards per hour using specialized metering pumps, and/or with surface application methods like discs and rotary mixers. The lower percentage SAP blend was shown to reduce leaching potential, stabilizing to control migration of contaminants at coal ash landfills, and controls/reduces the amount of free liquid present in transport prior to disposal.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

I claim:

1. An absorbent composition for environmental waste solidification, comprising:
    a population of superabsorbent polymer particles (SAP);
    bentonite; and
    a cement,
    wherein the SAP, the bentonite, and the cement are together configured to absorb moisture from an ash waste and form a solidified ash mixture.

2. The composition of claim 1, wherein the cement comprises Portland cement.

3. The composition of claim 1, wherein the composition includes about 50% SAP, about 25% bentonite, and about 25% the cement.

4. The composition of claim 1, where the composition includes about 70-80% SAP, about 5-10% bentonite, and about 5-10% the cement.

5. The composition of claim 1, further comprising wood flour.

6. The composition of claim 1 wherein the SAP is contained in a pellet form.

7. The composition of claim 6 wherein the pellet form includes between about 2-8% SAP.

8. The composition of claim 1 wherein the SAP is cross-linked internally and on its surface.

9. The composition of claim 1 wherein the SAP is contained inside a water-soluble packet.

10. A method for solidification of environmental waste, comprising:
    selecting a population of superabsorbent polymer particles (SAP);
    mixing the SAP with bentonite and with a cement, to form an absorbent composition comprising the SAP, the bentonite, and the cement;
    and
    mixing the absorbent composition with ash waste, wherein the SAP, the bentonite, and the cement are together configured to absorb moisture from the ash waste and form a solidified ash mixture.

11. The method of claim 10 wherein the solidified ash mixture passes a paint filter test.

12. The method of claim 10, wherein the absorbent composition includes between 0.5% and 2% of the SAP by dry weight.

13. The method of claim 10, comprising including wood flour in the absorbent composition.

14. The method of claim 10 including forming the absorbent composition into a pellet form.

* * * * *